(12) United States Patent
Kamo et al.

(10) Patent No.: US 11,024,838 B2
(45) Date of Patent: Jun. 1, 2021

(54) PRODUCTION METHOD OF NEGATIVE ELECTRODE ACTIVE MATERIAL FOR NON-AQUEOUS ELECTROLYTE SECONDARY BATTERY AND PRODUCTION METHOD OF NEGATIVE ELECTRODE FOR NON-AQUEOUS ELECTROLYTE SECONDARY BATTERY

(71) Applicant: SHIN-ETSU CHEMICAL CO., LTD., Tokyo (JP)

(72) Inventors: Hiromichi Kamo, Takasaki (JP); Takakazu Hirose, Annaka (JP); Katsunori Nishiura, Chiba (JP); Nan Fang, Ichihara (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 188 days.

(21) Appl. No.: 16/090,850

(22) PCT Filed: Apr. 3, 2017

(86) PCT No.: PCT/JP2017/013997
§ 371 (c)(1),
(2) Date: Oct. 3, 2018

(87) PCT Pub. No.: WO2017/179457
PCT Pub. Date: Oct. 19, 2017

(65) Prior Publication Data
US 2019/0115586 A1  Apr. 18, 2019

(30) Foreign Application Priority Data

Apr. 13, 2016 (JP) .............................. JP2016-080102

(51) Int. Cl.
*H01M 4/04* (2006.01)
*H01M 4/131* (2010.01)
(Continued)

(52) U.S. Cl.
CPC ......... *H01M 4/134* (2013.01); *H01M 4/0471* (2013.01); *H01M 4/131* (2013.01);
(Continued)

(58) Field of Classification Search
CPC .... H01M 4/0471; H01M 4/131; H01M 4/134; H01M 4/1391; H01M 4/1395;
(Continued)

(56) References Cited

U.S. PATENT DOCUMENTS 5,395,711 A    3/1995 Tahara et al.
7,459,236 B2  12/2008 Konishiike et al.
(Continued)

FOREIGN PATENT DOCUMENTS

CN    1591936 A     3/2005
CN  103840136 A     6/2014
(Continued)

OTHER PUBLICATIONS

Jul. 30, 2019 Extended Search Report issued in European Patent Application No. 17782275.6.
(Continued)

*Primary Examiner* — Brittany L Raymond
(74) *Attorney, Agent, or Firm* — Oliff PLC

(57) ABSTRACT

A production method of a negative electrode active material for non-aqueous electrolyte secondary batteries containing particles of lithium-containing silicon compound includes: preparing particles of silicon compound containing a silicon compound (SiOx: $0.5 \leq x \leq 1.6$); obtaining particles of lithium-containing silicon compound by making the particle of silicon compound contact with a solution A that contains lithium and has an ether-based solvent as a solvent; and heating the particles of the lithium-containing silicon compound. A production method of a negative electrode active material for non-aqueous electrolyte secondary batteries is
(Continued)

capable of increasing battery capacity of the negative electrode active material and capable of improving the first time efficiency and cycle characteristics.

16 Claims, 2 Drawing Sheets

(51) Int. Cl.
| | |
|---|---|
| *H01M 4/134* | (2010.01) |
| *H01M 4/1391* | (2010.01) |
| *H01M 4/1395* | (2010.01) |
| *H01M 4/36* | (2006.01) |
| *H01M 4/38* | (2006.01) |
| *H01M 4/485* | (2010.01) |
| *H01M 10/052* | (2010.01) |
| *H01M 4/48* | (2010.01) |
| *H01M 4/40* | (2006.01) |
| *H01M 4/02* | (2006.01) |

(52) U.S. Cl.
CPC ....... *H01M 4/1391* (2013.01); *H01M 4/1395* (2013.01); *H01M 4/364* (2013.01); *H01M 4/382* (2013.01); *H01M 4/386* (2013.01); *H01M 4/405* (2013.01); *H01M 4/48* (2013.01); *H01M 4/485* (2013.01); *H01M 10/052* (2013.01); *H01M 2004/027* (2013.01)

(58) Field of Classification Search
CPC ...... H01M 4/364; H01M 4/382; H01M 4/386; H01M 4/405; H01M 4/485; H01M 2004/027; H01M 10/052
See application file for complete search history.

(56) References Cited

U.S. PATENT DOCUMENTS

| | | | |
|---|---|---|---|
| 8,377,592 B2 | 2/2013 | Jeong et al. | |
| 2005/0118083 A1 | 6/2005 | Tabuchi | |
| 2006/0099507 A1 | 5/2006 | Kogetsu et al. | |
| 2008/0176137 A1 | 7/2008 | Endo et al. | |
| 2009/0202911 A1 | 8/2009 | Fukuoka et al. | |
| 2011/0135810 A1 | 6/2011 | Yakovleva et al. | |
| 2015/0030932 A1* | 1/2015 | Yoshida | C01B 33/32 |
| | | | 429/231.9 |
| 2015/0115206 A1* | 4/2015 | Fujii | H01G 11/50 |
| | | | 252/506 |
| 2015/0194671 A1* | 7/2015 | Nakahara | H01M 4/525 |
| | | | 429/221 |
| 2015/0270540 A1 | 9/2015 | Kouzu et al. | |
| 2015/0287989 A1 | 10/2015 | Hirose et al. | |
| 2016/0087270 A1 | 3/2016 | Yoshikawa et al. | |
| 2016/0254525 A1 | 9/2016 | Hirose et al. | |

FOREIGN PATENT DOCUMENTS

| | | | |
|---|---|---|---|
| CN | 103855364 A | | 6/2014 |
| CN | 104471757 A | | 3/2015 |
| CN | 104737336 A | | 6/2015 |
| CN | 104979524 A | | 10/2015 |
| CN | 105229828 A | | 1/2016 |
| EP | 2913872 A1 | | 9/2015 |
| JP | 2997741 B2 | | 1/2000 |
| JP | 2000-195505 A | | 7/2000 |
| JP | 2001-185127 A | | 7/2001 |
| JP | 2002-042806 A | | 2/2002 |
| JP | 2005-108826 A | | 4/2005 |
| JP | 2005-235439 A | | 9/2005 |
| JP | 2006-114454 A | | 4/2006 |
| JP | 2006-164954 A | | 6/2006 |
| JP | 2007-234255 A | | 9/2007 |
| JP | 2008-177346 A | | 7/2008 |
| JP | 2008-251369 A | | 10/2008 |
| JP | 2008-282819 A | | 11/2008 |
| JP | 2009-070825 A | | 4/2009 |
| JP | 2009-205950 A | | 9/2009 |
| JP | 2009-212074 A | | 9/2009 |
| JP | 2013-513206 A | | 4/2013 |
| JP | 2014-103019 | * | 6/2014 |
| JP | 2014-103019 A | | 6/2014 |
| JP | 2015-043310 A | | 3/2015 |
| JP | 2015-111547 A | | 6/2015 |
| JP | 2016-192385 A | | 11/2016 |
| TW | 201424098 A | | 6/2014 |
| WO | 2013/168727 A1 | | 11/2013 |

OTHER PUBLICATIONS

Oct. 16, 2018 International Preliminary Report on Patentability issued in International Patent Application No. PCT/JP2017/013997.
Nov. 5, 2019 Office Action issued in Japanese Patent Application No. 2018-511969.
Jun. 25, 2019 Office Action issued in Japanese Patent Application No. 2018-511969.
May 16, 2017 International Search Report issued in International Patent Application No. PCT/JP2017/013997.
Jun. 8, 2020 Office Action issued in Taiwanese Patent Application No. 106112145.
Jan. 21, 2021 Office Action issued in Chinese Patent Application No. 201780023263.6.

* cited by examiner

[FIG. 1]
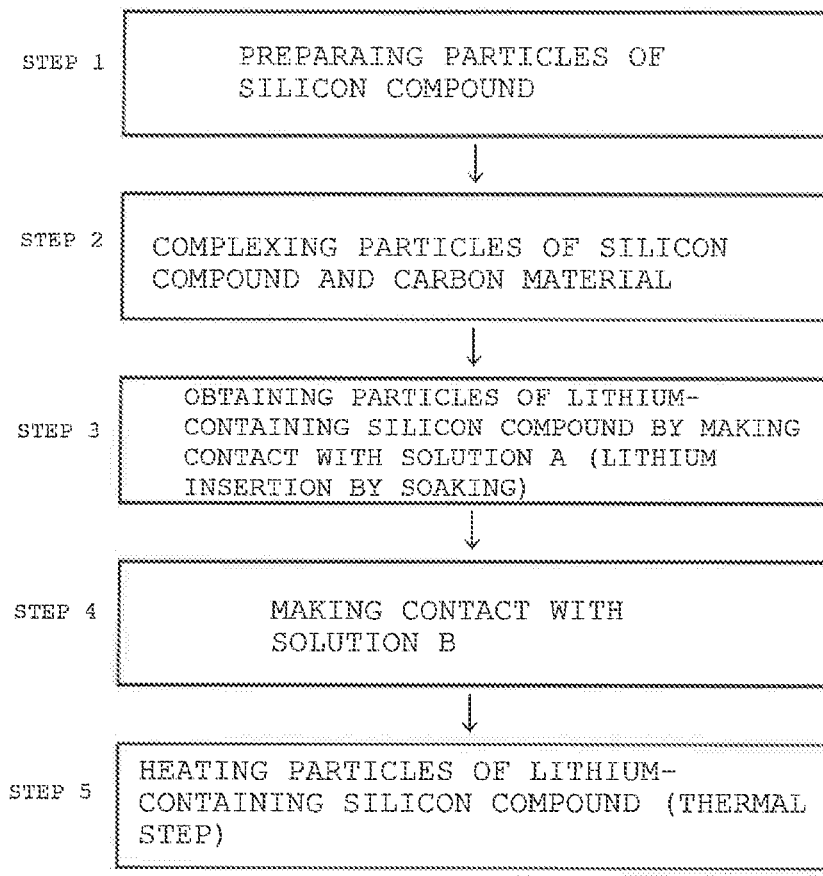
[FIG. 2]
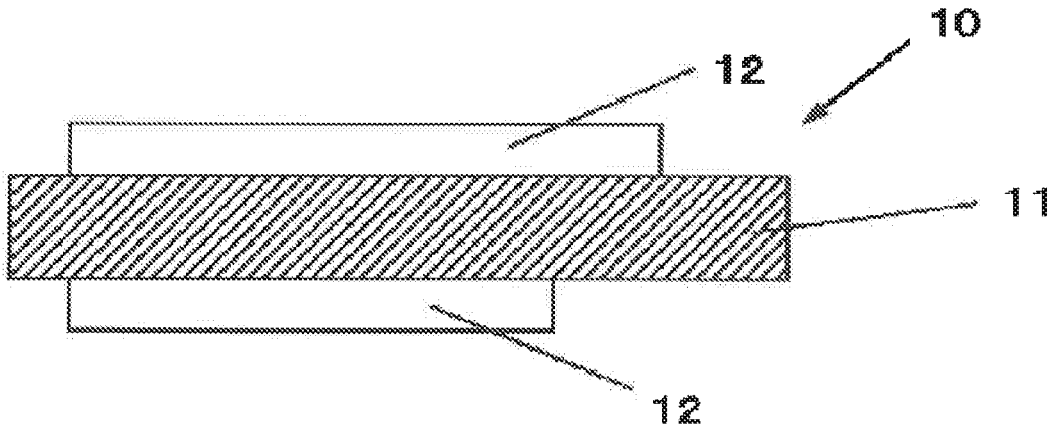

[FIG. 3]
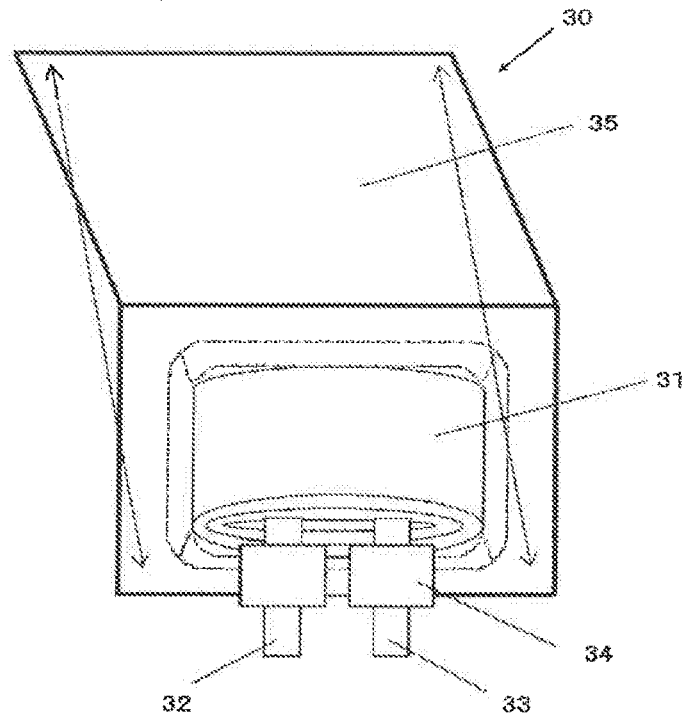
[FIG. 4]
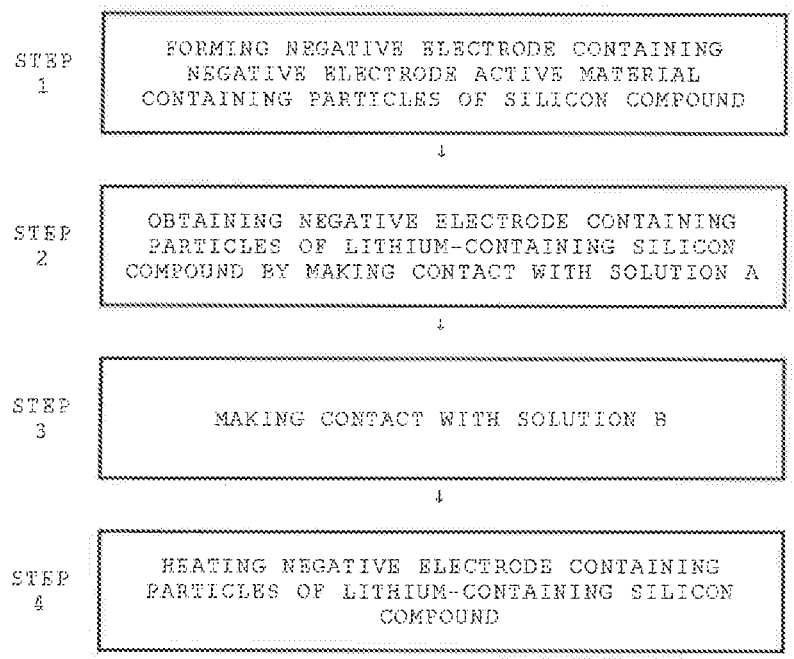

PRODUCTION METHOD OF NEGATIVE ELECTRODE ACTIVE MATERIAL FOR NON-AQUEOUS ELECTROLYTE SECONDARY BATTERY AND PRODUCTION METHOD OF NEGATIVE ELECTRODE FOR NON-AQUEOUS ELECTROLYTE SECONDARY BATTERY

TECHNICAL FIELD

The present invention relates to a production method of a negative electrode active material for non-aqueous electrolyte secondary batteries and a production method of a negative electrode for non-aqueous electrolyte secondary batteries.

BACKGROUND ART

In recent years, small-sized electronic devices represented by mobile terminals and the like have been widely spread and further down-sizing, lighter weight and longer life are strongly demanded. To a market demand like this, developments of secondary batteries capable of obtaining, in particular, a smaller size, a lighter weight and a higher energy density have been forwarded. The secondary batteries have been studied to apply also to large-sized electronic devices represented by automobiles and power-storage systems represented by houses or the like without limiting to small-sized electronic devices.

Among these, a lithium ion secondary battery is highly expected because smaller size and higher capacity are easy to obtain and the energy density higher than that of a lead battery or a nickel-cadmium battery may be obtained.

The lithium ion secondary battery includes a positive electrode and a negative electrode, and an electrolytic solution together with a separator. The negative electrode includes a negative electrode active material related to a charge/discharge reaction.

As the negative electrode active material, while a carbon-based active material is widely used, a further improvement in a battery capacity is demanded from recent market demand. As a factor for improving the battery capacity, it has been studied to use silicon as the negative electrode active material. This is because the silicon has a theoretical capacity (4199 mAh/g) of 10 times or more a theoretical capacity of graphite (372 mAh/g), and a great improvement in the battery capacity is expected. A development of a silicon material as the negative electrode active material includes studies on not only a silicon simple substance but also on compounds represented by alloys, oxides or the like. Shapes of the active material have been studied, from a standard coating type for the carbon material to an integrated type directly deposited on a current collector.

However, when the silicon is used as a main raw material as the negative electrode active material, since particles of negative electrode active material expand and contract during charge/discharge, cracks are likely to occur mainly in the neighborhood of a superficial layer of the particles of negative electrode active material. Furthermore, an ionic substance is generated inside the active material, and the particles of negative electrode active material are likely to be cracked. When the superficial layer of the particles of negative electrode active material is cracked, a new surface is generated thereby, and a reaction area of the particles of negative electrode active material increases. At this time, the electrolytic solution is consumed since a decomposition reaction of an electrolytic solution occurs on the new surface and a film that is a decomposition product of the electrolytic solution is formed on the new surface. Therefore, the cycle characteristics become easily degraded.

Until now, in order to improve an initial efficiency and cycle characteristics of a battery, negative electrode materials for lithium ion secondary batteries having the silicon material as a main material and electrode structures have been variously studied.

Specifically, in order to obtain excellent cycle characteristics and high safety, silicon and amorphous silicon dioxide are simultaneously deposited by using a gas phase method (for example, Patent Literature 1). Furthermore, in order to obtain high battery capacity and safety, a carbon material (an electronically conductive material) is provided on a superficial layer of particles of silicon oxide (for example, Patent Literature 2). Furthermore, in order to improve the cycle characteristics and to obtain high input/output characteristics, an active material containing silicon and oxygen is prepared and an active material layer having a high oxygen ratio in the neighborhood of a current collector is formed (for example, Patent Literature 3). Still furthermore, in order to improve the cycle characteristics, oxygen is contained in a silicon active material such that an average oxygen content is 40 atomic percent or less, and an oxygen content is high in a place close to a current collector (for example, Patent Literature 4).

Furthermore, in order to improve a first time charge/discharge efficiency, a nano composite containing a Si phase, $SiO_2$ and $M_yO$ metal oxide is used (for example, Patent Literature 5). Still furthermore, in order to improve the first time charge/discharge efficiency, a Li-containing substance is added to the negative electrode, and pre-doping where the Li-containing substance is decomposed at a place where a negative electrode potential is high to return the Li to a positive electrode is performed (for example, Patent Literature 6).

Furthermore, in order to improve the cycle characteristics, $SiO_x$ ($0.8 \leq x \leq 1.5$, a particle size range=1 μm to 50 μm) and a carbon material are mixed and sintered at a high temperature (for example, Patent Literature 7). Furthermore, in order to improve the cycle characteristics, an active material is controlled in the range such that a molar ratio of oxygen to silicon in a negative electrode active material is from 0.1 to 1.2, and a difference of the maximum value and the minimum value of the molar ratio of an oxygen amount to a silicon amount in the neighborhood of an interface of the active material and a current collector is 0.4 or less (for example, Patent Literature 8). Furthermore, in order to improve the battery load characteristics, metal oxide containing lithium is used (for example, Patent Literature 9). Still furthermore, in order to improve the cycle characteristics, a hydrophobic layer such as a silane compound is formed on a superficial layer of a silicon material (for example, Patent Literature 10).

Furthermore, in order to improve the cycle characteristics, silicon oxide is used, and a graphite film is formed on a superficial layer thereof to impart the electric conductivity (for example, Patent Literature 11). In this case, in Patent Literature 11, regarding a shift value obtained from a Raman spectrum of the graphite film, broad peaks appear in 1330 $cm^{-1}$ and 1580 $cm^{-1}$, and an intensity ratio thereof $I_{1330}/I_{1580}$ is $1.5 < I_{1330}/I_{1580} < 3$.

Furthermore, in order to obtain high battery capacity and to improve cycle characteristics, particles having a silicon crystallite phase dispersed in silicon dioxide are used (for example, Patent Literature 12). Still furthermore, in order to improve overcharge and overdischarge characteristics, silicon oxide in which an atomic ratio of silicon and oxygen is controlled to 1:y (0<y<2) is used (for example, Patent Literature 13).

Furthermore, in order to improve high battery capacity and first time efficiency, there is a method where an alloy-based material is brought into contact with a solution containing an alkali metal and a polycyclic aromatics compound, followed by soaking in a solution that detach the alkali metal element (for example, Patent Literature 14).

CITATION LIST

Patent Literature

Patent Literature 1: JP 2001-185127 A
Patent Literature 2: JP 2002-042806 A
Patent Literature 3: JP 2006-164954 A
Patent Literature 4: JP 2006-114454 A
Patent Literature 5: JP 2009-070825 A
Patent Literature 6: JP 2013-513206 W
Patent Literature 7: JP 2008-282819 A
Patent Literature 8: JP 2008-251369 A
Patent Literature 9: JP 2008-177346 A
Patent Literature 10: JP 2007-234255 A
Patent Literature 11: JP 2009-212074 A
Patent Literature 12: JP 2009-205950 A
Patent Literature 13: JP 2997741 B1
Patent Literature 14: JP 2005-235439 A

SUMMARY OF INVENTION

Technical Problem

As was described above, in recent years, higher performance and multi-functionalization of small-sized electronic devices typical in mobile terminals or the like have been forwarded, and a secondary battery that is a main power source thereof, in particular, a lithium ion secondary battery is required to have an increased battery capacity. As one measure to solve the problem, a development of non-aqueous electrolyte secondary batteries that use a negative electrode that uses a silicon material as a main agent has been desired. Furthermore, a non-aqueous electrolyte secondary battery that uses the silicon material is desired to have the cycle characteristics close to the equivalent with a non-aqueous electrolyte secondary battery that uses a carbon material.

Accordingly, by using each of a thermal Li insertion reaction or an electrical Li insertion reaction alone, the cycle retention rate and first time efficiency of a battery have been improved. However, a modified silicon oxide has relatively low water resistance because the modified silicon oxide is modified with Li. Therefore, there was a problem that the stability of a slurry that contains the modified silicon oxide and is prepared during production of a negative electrode is likely to be insufficient. On the other hand, when the Li insertion (Li pre-doping) is performed after preparation of a negative electrode containing the silicon oxide, the problem of slurry stability is difficult to occur because there is no need of preparing an aqueous slurry containing the pre-doped silicon oxide. However, even in the case like this, a secondary battery that uses the Li pre-doped negative electrode had poor first time charge/discharge efficiency.

The present invention was performed in view of the above problems, and it is intended to provide a production method of a negative electrode active material for non-aqueous electrolyte secondary batteries capable of increasing battery capacity and improving the first time efficiency and the cycle characteristics of the negative electrode active material. Furthermore, the present invention intends to provide a production method of a negative electrode for non-aqueous electrolyte secondary batteries capable of improving the first time charge/discharge efficiency.

Solution to Problem

In order to achieve the above object, the present invention provides a production method of a negative electrode active material for non-aqueous electrolyte secondary batteries containing particles of lithium-containing silicon compound including: preparing particles of silicon compound containing a silicon compound (SiOx: $0.5 \leq x \leq 1.6$); obtaining particles of lithium-containing silicon compound by making the particle of silicon compound contact with a solution A that contains lithium and has an ether-based solvent as a solvent; and heating the particles of the lithium-containing silicon compound.

A negative electrode active material containing particles of lithium-containing silicon compound produced according to the production method of the negative electrode active material of the present invention like this may increase the battery capacity because the negative electrode active material is a silicon-based active material mainly made of a silicon compound. Furthermore, the cycle characteristics may be improved because the silicon compound is expressed by a general formula SiOx (SiOx: $0.5 \leq x \leq 1.6$), and the particles of silicon compound contain lithium.

Furthermore, in the production method of a negative electrode of the present invention, by passing two kinds of obtaining particles of lithium-containing silicon compound by making contact with a solution A (hereinafter referred to also as Li insertion by soaking) and heating particles of lithium-containing silicon compound (hereinafter referred to also as heating) as lithium (Li) insertion, a component that reacts with water used during negative electrode slurry formation among Li inserted in the Li insertion by soaking is transformed into a thermodynamically more stable substance by a thermal treatment, the first time efficiency is improved, furthermore, a substance capable of obtaining a slurry that uses water may be produced.

Furthermore, it is preferable that forming a carbon coating film on the particles of silicon compound is provided before the obtaining particles of lithium-containing silicon compound.

By providing the carbon coating film on the particles of silicon compound like this, a decrease in the electric conductivity due to the Li insertion may be braked by a certain degree.

Furthermore, in the preparing the particles of silicon compound, it is preferable to prepare the particles of silicon compound having a crystallite size of silicon of 3 nm or more and 10 nm or less.

Thus, by appropriately adjusting the Si crystallite size in the particles of silicon compound, the first time efficiency may be enhanced and the cycle characteristics may be maintained.

Furthermore, it is preferable that in the obtaining the particles of lithium-containing silicon compound, a time of contacting with the solution A is set to 3 minutes or more.

When making the solution A contact for 3 minutes or more, Li may be more sufficiently inserted into the particles of silicon compound.

Furthermore, it is preferable to use as the solution A, a solution $A_1$ that contains lithium, and one or more kinds selected from straight chain polyphenylene compounds and derivatives thereof and polycyclic aromatic compounds and derivatives thereof, and contains an ether-based solvent as a solvent, or a solution $A_2$ that contains lithium, amines and an ether-based solvent as a solvent.

When a solution like these is used as the solution A containing lithium, more uniform Li insertion into the particles of silicon compound may be performed, furthermore, the Li insertion may be performed more efficiently. By the way, hereinafter, "one or more kinds selected from straight chain polyphenylene compounds and derivatives thereof and polycyclic aromatic compounds and derivatives thereof" is called also as "straight chain polyphenylene compound or the like".

In this case, it is preferable to use the solution $A_1$ as the solution A.

When the solution $A_1$ is used, the Li insertion may be particularly efficiently performed.

In this case, it is preferable to use a solution that contains lithium, contains one or more kinds selected from straight chain polyphenylene compounds and derivatives thereof, and has an ether-based solvent as a solvent as the solution $A_1$.

Thus, it is particularly preferable to use one that contains one or more kinds selected from the straight chain polyphenylene compounds and the derivatives thereof as the solution $A_1$.

Furthermore, in the heating, it is preferable to set a maximum temperature at 150° C. or more and 800° C. or less.

When the maximum temperature is set within the above range, crystal growth of silicon within particles of silicon compound may be suppressed, and the cycle retention rate may be prevented from degrading. Furthermore, when the thermal stabilization is sufficiently performed after the lithium insertion, the slurry is suppressed from becoming low viscosity during preparation of the negative electrode slurry, and the first time efficiency may be sufficiently improved.

Furthermore, it is preferable to set a lithium content of the particles of lithium-containing silicon compound at 4% by mass or more and 30% by mass or less.

When the lithium content of the particles of lithium-containing silicon compound is moderately adjusted, the discharge capacity may be moderately adjusted while enhancing the first time efficiency.

Furthermore, the heating is preferably performed without making the particles of lithium-containing silicon compound contact with moisture after the obtaining the particles of lithium-containing silicon compound.

According to the production method of the negative electrode active material like this, a component that reacts with water used during negative electrode slurry formation among Li inserted in the Li insertion by soaking may be changed to a substance thermodynamically more stable by a thermal process without making contact with moisture. Thus, the slurry is surely suppressed from becoming low viscosity during the preparation of negative electrode slurry and the first time efficiency may be sufficiently improved.

Furthermore, the present invention provides a production method of a negative electrode for non-aqueous electrolyte secondary batteries containing a negative electrode active material containing particles of lithium-containing silicon compound including:

forming a negative electrode containing a negative electrode active material containing particles of silicon compound containing a silicon compound (SiOx: $0.5 \leq x \leq 1.6$);

obtaining a negative electrode containing particles of lithium-containing silicon compound by making the particles of silicon compound contained in the negative electrode contact with a solution A that contains lithium and has an ether-based solvent as a solvent; and heating the negative electrode containing the particles of lithium-containing silicon compound.

The negative electrode containing a negative electrode active material containing particles of lithium-containing silicon compound produced according a production method of a negative electrode of the present invention like this may enhance the battery capacity because a silicon-based active material mainly made of a silicon compound is contained. Furthermore, the cycle characteristics may be improved because the silicon compound is expressed by a general formula SiOx (SiOx: $0.5 \leq x \leq 1.6$) and particles of silicon compound contains lithium.

Furthermore, according to a production method of a negative electrode of the present invention, by passing two kinds of processes of obtaining a negative electrode containing the particles of lithium-containing silicon compound by making contact with the solution A and by heating the negative electrode containing particles of the lithium-containing silicon compound as inserting lithium (Li), a negative electrode capable of improving the first time charge/discharge efficiency may be produced.

Furthermore, it is preferable that before the forming the negative electrode, forming a carbon coating film on a surface of the particle of silicon compound is provided.

When the particles of silicon compound have the carbon coating film like this, a decrease of electric conductivity due to Li insertion may be braked to a certain degree.

Furthermore, in the forming the negative electrode, it is preferable to use silicon having a crystallite size of 3 nm or more and 10 nm or less as the particles of silicon compound.

Thus, by moderately adjusting a Si crystallite size in the particles of silicon compound, the first time efficiency may be enhanced and the cycle characteristics may be maintained.

Furthermore, it is preferable to set a time of making contact with the solution A to 3 minutes or more in the obtaining the negative electrode containing the particles of lithium-containing silicon compound.

By making contact with the solution A for 3 minutes or more, Li may be more sufficiently inserted into the particles of silicon compound.

Furthermore, it is preferable to use a solution $A_1$ that contains lithium, contains one or more kinds selected from straight chain polyphenylene compounds and derivatives thereof and polycyclic aromatic compounds and derivatives thereof, and has an ether-based solvent as a solvent, or solution $A_2$ that contains lithium and amines and has an ether-based solvent as a solvent as the solution A.

When the solutions like these are used as the solution A that contains lithium, the Li is more uniformly inserted into the particles of silicon compound, and, the Li may be efficiently inserted.

In this case, it is preferable to use the solution $A_1$ as the solution A.

When the solution $A_1$ is used, the Li may be particularly efficiently inserted.

In this case, it is preferable to use a solution that contains lithium, and contains one or more kinds selected from straight chain polyphenylene compounds and derivatives thereof, and has an ether-based solvent as a solvent as the solution $A_1$.

Thus, it is particularly preferable to use one that contains one or more kinds selected from the straight chain polyphenylene compounds and derivatives thereof as the solution $A_1$.

Furthermore, the heating is preferably performed at a heating temperature of 70° C. or more.

When the heating temperature is set to 70° C. or more, crystal growth of silicon inside the particles of silicon compound may be suppressed, and the cycle retention rate may be prevented from degrading.

Furthermore, in the heating, a heating time is preferable to be 30 minutes or more.

When the heating time is set to 30 minutes or more, the crystal growth of silicon inside the particles of silicon compound may be suppressed, and the cycle retention rate may be prevented from being degraded.

Furthermore, the heating is preferably performed under an inert gas atmosphere or under an ambient atmosphere.

By heating under the atmosphere like this, a negative electrode capable of more improving the first time charge/discharge efficiency may be produced.

Furthermore, it is preferable to set a lithium content of the particles of lithium-containing silicon compound to 4% by mass or more and 30% by mass or less by the obtaining a negative electrode containing the particles of lithium-containing silicon compound.

By moderately adjusting the lithium content of the particles of lithium-containing silicon compound, the discharge capacity may be moderately adjusted while enhancing the first time efficiency.

Furthermore, it is preferable to form a negative electrode that further contains a binder as the negative electrode in the forming the negative electrode.

According to a method of producing a negative electrode for non-aqueous electrolyte secondary batteries that contains the negative electrode active material and the binder like this, a secondary battery that uses the obtained negative electrode preferably exhibits more excellent battery characteristics.

Advantageous Effects of Invention

According to a production method of a negative electrode active material of the present invention, a negative electrode active material capable of obtaining high capacity, and excellent cycle characteristics and initial charge/discharge characteristics when used in a non-aqueous electrolyte secondary battery may be produced. Furthermore, the production method of a negative electrode of the present invention may produce a negative electrode capable of obtaining excellent first time charge/discharge efficiency when used in the non-aqueous electrolyte secondary battery.

Furthermore, the same characteristics may be obtained also in a secondary battery that contains a negative electrode active material produced according to a production method of a negative electrode active material of the present invention or a negative electrode produced by a production method of a negative electrode of the present invention. Furthermore, the same effect may be obtained also in an electronic device, an electric tool, an electric vehicle and a power storage system, which use the secondary battery.

BRIEF DESCRIPTION OF THE DRAWINGS

FIG. 1 is a flow-chart showing one example of a production method of a negative electrode active material for non-aqueous electrolyte secondary batteries of the present invention;

FIG. 2 is a schematic cross-sectional diagram showing one example of a structure of a negative electrode that uses the negative electrode active material for non-aqueous electrolyte secondary batteries produced according to a production method of a negative electrode active material of the present invention;

FIG. 3 is an exploded diagram showing one example of a structure of a non-aqueous electrolyte secondary battery (laminate film type lithium ion secondary battery) produced using a negative electrode active material for non-aqueous electrolyte secondary batteries produced according to a production method of a negative electrode active material of the present invention; and FIG. 4 is a flow-chart showing one example of a production method of a negative electrode for non-aqueous electrolyte secondary batteries of the present invention.

DESCRIPTION OF EMBODIMENTS

In what follows, the present invention will be described in more detail.

As was described above, as one of methods for making the battery capacity of the non-aqueous electrolyte secondary battery increase, it has been studied to use a negative electrode that uses a silicon material as a main material as a negative electrode of non-aqueous electrolyte secondary batteries.

The non-aqueous electrolyte secondary battery that uses the silicon material is desired to have the cycle characteristics close to the same as the non-aqueous electrolyte secondary battery that uses a carbon material. However, a negative electrode material that shows the cycle stability equivalent with the non-aqueous electrolyte secondary battery that uses the carbon material has not been proposed. Furthermore, since a silicon compound that contains, in particular, oxygen has the first time efficiency lower than the carbon material, an improvement in the battery capacity was limitative for that part.

There, the cycle retention rate and first time efficiency of the battery have been improved by using a silicon oxide modified by the insertion and partial release of Li as a negative electrode active material. However, when the Li insertion is applied, there was a problem that a Li-containing chemical species generated inside the particles of silicon compound by the lithium insertion enhances alkalinity temporally during preparation of a negative electrode slurry and cuts a molecular chain of a binder to invite lower viscosity of the slurry, or reacts with the binder or a solvent molecule in the negative electrode slurry to result in difficulty of forming a slurry. On the other hand, when the Li insertion (Li pre-doping) is performed after the preparation of the negative electrode containing silicon oxide, a problem of slurry stability is difficult to occur because there is no need of preparing an aqueous slurry containing silicon compound after the Li pre-doping. However, even in the case like this, the first time charge/discharge efficiency was poor in a secondary battery that uses a negative electrode after the Li pre-doping.

There, the present inventors have intensively studied about a production method of a negative electrode active material capable of obtaining high battery capacity and excellent cycle characteristics and first time efficiency when used in a non-aqueous electrolyte secondary battery, and a production method of a negative electrode for non-aqueous electrolyte secondary batteries capable of improving the first time charge/discharge efficiency, and came to the present invention.

In what follows, an embodiment of the present invention will be specifically described with reference to drawings, however, the present invention is not limited thereto.

FIG. 1 is a flow-chart showing one example of a production method of a negative electrode active material for non-aqueous electrolyte secondary batteries of the present invention.

First, a flow of an entirety of execution procedure will be described. According to a production method of a negative electrode active material for non-aqueous electrolyte secondary batteries of the present invention, as shown in FIG. 1, first, particles of silicon compound containing a silicon compound (SiOx: $0.5 \leq x \leq 1.6$) are prepared (step 1).

Next, as shown in FIG. 1, the particles of silicon compound prepared in the step 1 and a carbon material may be complexed (step 2). However, this process is not indispensable.

Subsequently, as shown in FIG. 1, the particles of silicon compound prepared in the step 1 or the particles of silicon compound obtained by complexing the carbon material in the step 2 are brought into contact with a solution A that contains lithium and has an ether-based solvent as a solvent to obtain particles of lithium-containing silicon compound (step 3: Li insertion step by soaking).

Next, as shown in FIG. 1, the particles of silicon compound into which lithium was inserted in the step 3 are brought into contact with a solution B that contains one or more kinds selected from polycyclic aromatic compounds and derivatives thereof and has a solvent that is one or more kinds selected from ether-based solvents, ketone-based solvents, ester-based solvents, alcohol-based solvents and amine-based solvents (step 4). However, this process is not indispensable.

Subsequently, as shown in FIG. 1, the particles of silicon compound into which the lithium was inserted in the step 3 or the particles of silicon compound which were brought into contact with the solution B in the step 4 are heated (step 5: thermal step (heating step)). By carrying out the heat treatment, thermally stabilized particles of lithium-containing silicon compound are obtained.

The negative electrode active material containing the particles of lithium-containing silicon compound produced according to the production method of the negative electrode active material of the present invention like this is a silicon-based active material mainly made of a silicon compound. Therefore, the battery capacity may be enhanced. Furthermore, since the silicon compound is expressed by a general formula SiOx (however, $0.5 \leq x \leq 1.6$) and the particles of silicon compound contain lithium, the cycle characteristics may be enhanced. Furthermore, by making the Li contain in the particles of silicon compound, irreversible capacity may be reduced during first time charge/discharge of a battery containing the silicon-based active material.

Furthermore, according to the production method of a negative electrode active material of the present invention, an active Li chemical species generated at the time of the Li insertion may be stabilized by introducing a thermally stabilizing process after the Li insertion into the particles of silicon compound. Thus, a negative electrode slurry such as an aqueous slurry in which the negative electrode active material was mixed may be prevented from being gelled. Furthermore, the negative electrode slurry is suppressed from becoming low viscosity. Therefore, peel strength (peel difficulty) of a negative electrode obtained by using the negative electrode slurry is improved, and the cycle characteristics and first time efficiency of a non-aqueous electrolyte secondary battery using the negative electrode are improved. Furthermore, crystallites may be suppressed from growing by heating at a moderate heating temperature (for example, a maximum temperature is 150° C. or more and 800° C. or less). Accordingly, a non-aqueous electrolyte secondary battery produced with the electrode (negative electrode) containing the negative electrode active material has excellent battery characteristics.

Subsequently, a production method of a negative electrode active material of the present invention will be more specifically described.

(1. Production Method of Negative Electrode Active Material)

First, particles of silicon compound containing a silicon compound (SiOx: $0.5 \leq x \leq 1.6$) are prepared (step 1 in FIG. 1). A silicon compound expressed by a general formula SiOx ($0.5 \leq x \leq 1.6$) like this may be prepared according to, for example, the following procedure. First, a raw material that generates silicon oxide gas is heated under presence of inert gas or under reduced pressure in the temperature range of from 900° C. to 1600° C. to generate silicon oxide gas. In this case, a mixture of metallic silicon powder and silicon dioxide powder may be used as a raw material and when considering that a surface oxygen is present on the metallic silicon powder and a slight amount of oxygen is present in a reaction furnace, a mixing molar ratio is desirably in the range of 0.8<metallic silicon powder/silicon dioxide powder<1.3. A gas generated from the raw material is deposited on an absorption plate. Subsequently, with a temperature inside the reaction furnace lowered to 100° C. or less, a deposit is taken out, followed by crushing, pulverizing with a ball mill or a jet mill. By the way, the crystallinity such as a size of Si crystallites in the particles of silicon compound may be controlled by adjusting a charge range (mixing molar ratio) or a heating temperature of the raw material. Furthermore, the crystallinity may be controlled also by heat treating after generation of the particles of silicon compound.

In the step 1, it is preferable to prepare the particles of silicon compound that have a crystallite size of silicon of 3 nm or more and 10 nm or less. When the crystallite size is 10 nm or less, the capacity retention rate is increased because expansion and contraction of the particles of silicon compound accompanying charge/discharge becomes smaller. When the crystallite size is 3 nm or more, an improvement rate of the first time efficiency due to the Li insertion becomes sufficient. Accordingly, the capacity retention rate and first time efficiency may be improved when the crystallite size is controlled within the range. By the way, the crystallite size may be calculated from a half value width of a diffraction peak due to a Si (111) crystal plane obtained by X-ray diffractometry.

Furthermore, as a composition of a silicon compound prepared, x is preferable to be closer to 1. This is because high cycle characteristics may be obtained. Furthermore, the composition of the silicon compound in the present invention does not necessarily mean purity of 100% but may contain a slight amount of impurity elements.

Furthermore, the particles of silicon compound may be complexed with a carbon material (step 2 of FIG. 1). As a method of complexing, there are a method of preparing a carbon coating film on a surface of particles of silicon compound by a thermal CVD (Chemical Vapor Deposition) method or a method of physically mixing particles of silicon compound and a carbon material. It is possible to impart high electric conductivity by complexing the particles of silicon compound and the carbon material. In particular, by providing a carbon coating film to the particles of silicon compound, a decrease in the electric conductivity due to the Li insertion may be braked by a certain degree.

In particular, the thermal CVD method is desirable as a method of generating the carbon coating film on a surface of the particles of silicon compound. In the thermal CVD method, first, particles of silicon compound are set in a furnace. Subsequently, a hydrocarbon gas is filled in the furnace and an in-furnace temperature is elevated. By elevating the in-furnace temperature, the hydrocarbon gas is decomposed, and a carbon coating film is formed on a surface of the particles of silicon compound. A decomposition temperature of the hydrocarbon gas is not particularly limited but is desirably 1200° C. or less and particularly desirably 1050° C. or less. This is because unintentional disproportionation of the particles of silicon compound may be suppressed.

When the carbon coating film is generated by the thermal CVD method, a carbon coating film may be formed on a superficial layer of the powder material while adjusting a coverage and a thickness of the carbon coating film by adjusting, for instance, pressure, temperature in the furnace.

The hydrocarbon gas used in the thermal CVD method is, though not particularly limited, desirable to be n≤3 in a $C_nH_m$ composition. This is because a production cost may be lowered, and, the physical properties of a decomposition product is excellent.

Subsequently, the particles of silicon compound prepared in the step 1 or the particles of silicon compound obtained by complexing the carbon material in the step 2 are brought into contact with a solution A that contains lithium and has an ether-based solvent as a solvent to obtain particles of lithium-containing silicon compound (step 3 in FIG. 1). Thus, by making the particles of silicon compound contact with the solution A, the lithium is inserted in the particles of silicon compound, and particles of lithium-containing silicon compound may be obtained.

The negative electrode active material produced according the production method of the negative electrode active material of the present invention contains particles of silicon compound capable of absorbing and releasing lithium ion. And the Li is contained on a surface, inside, or both thereof of the particles of silicon compound to which the production method of the present invention is applied. The particles of silicon compound containing lithium like this may be obtained by selectively modifying (hereinafter, referred to as selective modification) a part of a $SiO_2$ component generated inside the particles of silicon compound to a Li compound by insertion of the Li.

It is preferable to use as the solution A used for selective modification, a solution $A_1$ that contains lithium, and one or more kinds selected from straight chain polyphenylene compounds and derivatives thereof and polycyclic aromatic compounds and derivatives thereof, and contains an ether-based solvent as a solvent, or a solution $A_2$ that contains lithium, amines and an ether-based solvent as a solvent.

Thus, when a method of inserting lithium by making the solution A bring into contact with particles of silicon compound is used, comparing with, for example, a thermal doping method where particles of silicon compound and metallic lithium are mixed and heated, disproportionation of the inside of the particles of silicon compound is suppressed, and the cycle characteristics are more improved. Furthermore, more uniform Li insertion into the particles of silicon compound may be performed because the lithium is complexed with a straight chain polyphenylene compound or amines to be dissolved in the solution. Among these, it is particularly preferable to use the solution $A_1$ that contains lithium and the straight chain polyphenylene compound. This is because the insertion reaction of lithium due to the solution $A_1$ may be handled in the neighborhood of room temperature and the lithium is complexed with the straight chain polyphenylene compound to be dissolved in the solution, and more uniform Li insertion into the particles of silicon compound may be performed thereby. Furthermore, by using an ether-based solvent as a solvent, the complex of lithium and the straight chain polyphenylene compounds or the amines are more stabilized, therefor, the lithium insertion into the particles of silicon compound occurs more efficiently. Among these, it is preferable to use a solution that contains lithium, contains one or more kinds selected from straight chain polyphenylene compounds and derivatives thereof and contains an ether-based solvent as a solvent.

In the selective modification due to a method like this, the generation of crystalline Li silicate may be suppressed because a temperature is not excessively elevated in the process of inserting Li into the particles of silicon compound. When the generation of the crystalline Li silicate is suppressed, Li ion conductivity inside the particles of silicon compound is improved, and further crystallization inside the particles of silicon compound becomes difficult to proceed to result in a further improvement in the cycle characteristics.

As the ether-based solvents used in the solutions A, $A_1$ and $A_2$, diethyl ether, tert-butyl methyl ether, tetrahydrofuran, dioxane, 1,2-diethoxyethane, diethylene glycol dimethyl ether, triethylene glycol dimethyl ether, tetraethylene glycol dimethyl ether or mixed solvents thereof may be used. Among these, tetrahydrofuran, dioxane, and 1,2-dimethoxyethane are particularly preferably used. These solvents are preferably dehydrated and preferably deoxygenated.

Furthermore, as the straight chain polyphenylene compound or derivative thereof contained in the solution $A_1$, one or more kinds selected from biphenyl, terphenyl and derivatives thereof may be used. Furthermore, as the polycyclic aromatic compound and derivative thereof contained in the solution $A_1$, one or more kinds selected from naphthalene, anthracene, phenanthrene, naphthacene, pentacene, pyrene, picene, triphenylene, coronene, chrysene and derivatives thereof may be used.

A total concentration of the straight chain polyphenylene compound and so on in the solution $A_1$ is preferably between from $10^{-3}$ mol/L to 5 mol/L and more preferably between from $10^{-1}$ mol/L to 3 mol/L. When the total concentration of the straight chain polyphenylene compound and so on is $10^{-3}$ mol/L or more, a reaction between a lithium metal and the straight chain phenylene compound or the like easily proceeds to be able to shorten a reaction time. When the total concentration of the straight chain polyphenylene compound and so on is 5 mol/L or less, a reaction product between the straight chain phenylene compound or the like and the lithium metal is difficult to attach to the particles of silicon compound and a powder of silicon compound may be readily separated. Furthermore, when the negative electrode active material is formed into a non-aqueous electrolyte secondary battery, without eluting a reaction residue into the electrolytic solution, the battery characteristics may be suppressed from degrading due to a side reaction. Furthermore, the lithium metal is preferably contained in the concentration of 0.5 equivalent or more relative to the straight chain polyphenylene compound and so on and a part thereof may not be dissolved.

Furthermore, as the amines contained in the solution $A_2$, dimethyl amine, ethyl methyl amine, diethyl amine, ethylene diamine and triethylene triamine may be used.

Furthermore, a time during which the particles of silicon compound and the solution A, $A_1$, or $A_2$ are brought into contact is preferably set to 3 minutes or more, and more preferably set to 3 minutes or more and 100 hours or less. When the contact time is 3 minutes or more, a sufficient dope amount of lithium is obtained.

Furthermore, at a time point where the contact time becomes 100 hours, the lithium insertion into the particles of silicon compound comes to a substantial equilibrium state. Furthermore, a reaction temperature is preferably from ~20° C. to 200° C., and more preferably from 0° C. to 50° C. Among these, the reaction temperature is particularly preferably set to in the vicinity of 20° C. In the temperature range such as described above, a reaction rate of the lithium insertion reaction into the particles of silicon compound is improved because a decrease in a reaction speed is difficult to occur, and a precipitate or the like of the lithium compound due to a side reaction is difficult to be generated.

A lithium content of the particles of silicon compound after the lithium insertion reaction by soaking is preferably 4% by mass or more and 30% by mass or less in terms of lithium relative to the silicon compound. When an amount of lithium content is 4% by mass or more, a sufficient improvement of first time efficiency may be desired. Furthermore, when the lithium content is 30% by mass or less, a non-aqueous electrolyte secondary battery having high discharge capacity may be produced.

Next, the particles of silicon compound into which the lithium was inserted in the step 3 are brought into contact with the solution B that contains one or more kinds selected from the polycyclic aromatic compounds and derivative thereof and contains one or more kinds selected from ether-based solvents, ketone-based solvents, ester-based solvents, alcohol-based solvents and amine-based solvents as a solvent (step 4 in FIG. 1). However, this step is not necessarily indispensable. Thus, when the particles of silicon compound are soaked in the solution B after the lithium insertion, active lithium is released from the particles of silicon compound.

As the polycyclic aromatic compound and derivative thereof contained in the solution $B_1$, one or more kinds selected from naphthalene, anthracene, phenanthrene, naphthacene, pentacene, pyrene, picene, triphenylene, coronene, chrysene and derivatives thereof may be used.

Furthermore, as the ether-based solvents, diethyl ether, tert-butyl methyl ether, tetrahydrofuran, dioxane, 1,2-diethoxyethane, diethylene glycol dimethyl ether, triethylene glycol dimethyl ether, and tetraethylene glycol dimethyl ether may be used. These may be used singularly or as a mixed solvent obtained by combining two or more kinds.

As the ketone-based solvent, acetone and acetophenone may be used. These may be used singularly or as a mixed solvent obtained by combining two or more kinds.

As the ester-based solvent, methyl formate, methyl acetate, ethyl acetate, propyl acetate, and isopropyl acetate may be used. These may be used singularly or as a mixed solvent obtained by combining two or more kinds.

As the alcohol-based solvent, methanol, ethanol, propanol and isopropyl alcohol may be used. These may be used singularly or as a mixed solvent obtained by combining two or more kinds.

As the amine-based solvent, methyl amine, ethyl amine, and ethylene diamine may be used. These may be used singularly or as a mixed solvent obtained by combining two or more kinds.

Furthermore, mixed solvents obtained by combining two or more kinds of the ether-based solvents, ketone-based solvents, ester-based solvents, alcohol-based solvents and amine-based solvent may be used.

Next, the particles of silicon compound into which the lithium was inserted in the step 3 or the particles of silicon compound which were brought into contact with the solution B in the step 4 are heated (step 5 in FIG. 1). Thus, when a thermal stabilization process is introduced after the insertion of Li into the particles of silicon compound or after the contact with the solution B, active Li chemical species generated at the time of the Li insertion may be stabilized. A Li portion inserted at a relatively low temperature by the Li insertion by soaking of the step 3 is converted into a thermally stable Li chemical species by heating in the step 5, a slurry is suppressed from becoming low viscosity when formed into a negative electrode slurry, and the peel strength of the negative electrode is improved. When the heating is not applied after the Li insertion by soaking, the stability of the negative electrode slurry becomes poor because there is a chemical species that is not thermodynamically stable is present.

The step 5 of performing the heat treatment is preferably performed in nitrogen or argon atmosphere. This is because the active Li chemical species generated in the step 3 does not react with an atmosphere gas.

In the step 5, it is preferable to set a maximum temperature during heating to 150° C. or more. This is because thus the active Li chemical species generated in the step 3 is converted into a thermally stable chemical species and the reactivity with water as the solvent during the negative electrode slurry preparation is suppressed. Furthermore, the maximum temperature is preferable to be set to 800° C. or less. When the maximum temperature is 800° C. or less, the crystallization of silicon in the particles of silicon compound is suppressed, expansion and contraction of silicon accompanying the charge/discharge becomes smaller, and cycle characteristics are improved. The maximum temperature at this time is more preferably 200° C. or more and 800° C. or less, further preferably 400° C. or more and 800° C. or less, and particularly preferably 400° C. or more and 700° C. or less.

Although a heating time in the step 5 is not particularly limited, for example, a holding time at the maximum temperature may be set to 1 minute or more and 10 hours or less.

Furthermore, it is preferable to perform the step 5 that undergoes heating process without making the particles of the lithium-containing silicon compound contact with moisture after the step of obtaining the particles of lithium-containing silicon compound. According to the production method of the negative electrode active material like this, among the Li inserted in the Li insertion by soaking, a component that reacts with water used when forming a negative electrode slurry is converted into a thermodynamically more stable substance by the heating step without bringing into contact with the moisture. Therefore, the slurry is surely suppressed from becoming low viscosity during the negative electrode slurry preparation and the first time efficiency may be sufficiently improved.

Furthermore, when the heat treatment is performed in the step 5, a lithium source may be added. As the lithium source, lithium metal, lithium hydride, or lithium nitride may be used.

When the heat treatment is performed in the step 5 by adding the lithium source, a heating temperature is preferably set to 400° C. or more. The heating temperature in this case is more preferably 400° C. or more and 800° C. or less, and particularly preferably 600° C. or more and 800° C. or less. When the heating temperature is 800° C. or less, the crystal growth of silicon inside the particles of silicon compound is suppressed, and the cycle characteristics may be prevented from degrading. When the heating temperature is 400° C. or more, the thermally stable Li compound is generated. Therefore, even when applied to an aqueous slurry, the first time efficiency may be sufficiently improved.

Furthermore, the obtained particles of the lithium-containing silicon compound may be washed with water to remove excess Li.

In this way, the negative electrode active material may be produced according to a production method of the negative electrode active material of the present invention. The negative electrode active material produced in this way may be used to constitute a negative electrode such as described below.

(2. Production Method of Negative Electrode for Non-Aqueous Electrolyte Secondary Battery)

Next, a production method of a negative electrode for non-aqueous electrolyte secondary batteries of the present invention will be described. First, a structure of a negative electrode obtained by the production method of a negative electrode of the present invention will be described.

(Structure of Negative Electrode)

As shown in FIG. 2, a negative electrode 10 is configured to have a negative electrode active material layer 12 on a negative electrode current collector 11. The negative electrode active material layer 12 may be formed on both surfaces or only on one surface of the negative electrode current collector 11.

(Negative Electrode Current Collector)

A negative electrode current collector is configured of a substance that is an excellent electrically conductive material and has excellent mechanical strength. As the electrically conductive materials that may be used for the negative electrode current collector 11, for example, copper (Cu) or nickel (Ni) may be used. It is preferable that the electrically conductive material does not form an intermetallic compound with lithium (Li).

It is preferable that the negative electrode current collector 11 contains carbon (C) or sulfur (S) other than a main element. This is because the physical strength of the negative electrode current collector 11 may be improved. In particular, in the case where an active material layer that expands during charge is included, deformation of the electrode including the negative electrode current collector may be suppressed when the negative electrode current collector includes the elements. Although contents of the elements are not particularly limited, among these, each is preferably 100 mass ppm or less. This is because higher deformation suppression effect is obtained.

A surface of the negative electrode current collector 11 may be roughened or may not be roughened. The surface-roughened negative electrode current collector is a metal foil treated by, for example, an electrolytic treatment, an embossing treatment, or a chemical etching treatment. The negative electrode current collector that is not surface-roughened is, for example, a rolled metal foil.

(Negative Electrode Active Material Layer)

Th silicon-based active material produced according to the production method of the negative electrode active material of the present invention becomes a material that constitutes the negative electrode active material layer 12. The negative electrode active material layer 12 contains a silicon-based active material, and, from the viewpoint of battery design, as needs arise, may further contain other materials such as a negative electrode binder or a negative electrode conductive assistant. As the negative electrode active material, other than the silicon-based active material, a carbon-based active material may be also contained.

The negative electrode like this may be produced by a coating method that uses the silicon-based active material produced according to the production method of the negative electrode active material of the present invention. The coating method is a method in which after the particles of silicon-based active material and the binder described below, and, as needs arise, the conductive assistant and the carbon-based active material described below are mixed, a mixture is dispersed in an organic solvent or water and is coated.

In this case, first, the silicon-based active material produced according to the production method of the negative electrode active material of the present invention, the conductive assistant, and the solvent such as water are mixed to obtain an aqueous slurry. At this time, as needs arise, the carbon-based active material may be also mixed. Next, the aqueous slurry is coated on a surface of the negative electrode current collector 11 and dried to form a negative electrode active material layer 12 of FIG. 2.

As the conductive assistant, any one kind or more of, for example, carbon black, acetylene black, graphite such as flake-like graphite, Ketjen Black, carbon nanotube, and carbon nanofiber may be used. These conductive assistants are preferable to be particulate one having a median diameter smaller than the particles of lithium-containing silicon compound. In this case, for example, acetylene black may be selected as the conductive assistant.

Furthermore, as the binder, for example, carboxymethyl cellulose, styrene-butadiene rubber, and polyacrylic acid may be used.

Furthermore, as the carbon-based active material, for example, pyrolyzed carbons, cokes, glass-like carbon fibers, organic polymer sinters, and carbon blacks may be used. Thus, the electric resistance of the negative electrode active material layer 12 may be reduced, and expansion stress accompanying the charge may be alleviated.

In the above, as one example of the production method of a negative electrode of the present invention, a method in which particles of lithium-containing silicon compound are heated, and a negative electrode is produced by using the particles of lithium-containing silicon compound after the heating was described, but the production method of negative electrode of the present invention is not limited thereto. Furthermore, in the present invention, a production method of negative electrode shown below is provided.

FIG. 4 is a flowchart that shows one example of a production method of a negative electrode for non-aqueous electrolyte secondary batteries of the present invention. According to the production method of a negative electrode for non-aqueous electrolyte secondary battery of the present invention, as shown in FIG. 4, first, a negative electrode containing a negative electrode active material containing particles of silicon compound containing a silicon compound (SiOx: $0.5 \leq x \leq 1.6$) is formed (Step 1). In this case, particles of silicon compound on a surface of which a carbon coating film was formed may be also used. As the particles of silicon compound, the same one as that before Li pre-doping exemplified by the production method of the negative electrode active material may be also used, and commercially available silicon oxide (KSC-1064, manufactured by Shin-Etsu Chemical Co., Ltd.) may be also used. As the negative electrode prepared in the Step 1, a negative electrode 10 shown in FIG. 2 may be used. Also as a material that constitutes a negative electrode current collector or a negative electrode active material layer, fundamentally the same ones as the negative electrode 10 shown in FIG. 2 may be used. That is, the negative electrode active material and the binder may be contained in the negative electrode active material layer. However, different from the negative electrode 10 shown in FIG. 2, in place of the negative electrode active material containing the particles of lithium-containing silicon compound after heating, a negative electrode active material containing the particles of silicon compound shown in the Step 1 of the FIG. 4 is used.

Next, as shown in FIG. 4, the particles of silicon compound contained in the negative electrode formed in the Step 1 were brought into contact with the solution A that contains lithium and has an ether-based solvent as a solvent to obtain a negative electrode containing the particles of lithium-containing silicon compound (Step 2). Details (composition, contact time and so on) of the solution A are as described in the production method of the negative electrode active material of the present invention described above.

Next, as shown in FIG. 4, the negative electrode containing the particles of silicon compound into which the lithium was inserted in Step 2 are brought into contact with the solution B (Step 3). However, the process is not indispensable. Details of the solution B are as described in the production method of the negative electrode active material of the present invention described above. By the way, when the solutions A and B are brought into contact with the particles of silicon compound in the negative electrode (electrode), the particles of silicon compound contained in the negative electrode may be brought into contact with the solutions A, B, for example, by soaking (impregnating) the negative electrode in the solutions A, B, or by sprinkling the solutions A, B on the negative electrode.

Subsequently, as shown in FIG. 4, the negative electrode containing the particles of silicon compound into which the lithium was inserted in Step 2 or the negative electrode containing the particles of silicon compound which were brought into contact with the solution B in Step 3 are heated (Step 4). By applying the heat treatment, a negative electrode containing the particles of thermally stabilized lithium-containing silicon compound may be obtained.

In the method shown in FIG. 4, the heating preferably has the heating temperature of 70° C. or more. In this case, an upper limit of the heating temperature is preferably 250° C. or less and more preferably 200° C. or less. Furthermore, the heating preferably has a heating time of 30 minutes or more. In this case, an upper limit of heating time is not particularly limited, but may be set to, for example, 24 hours. When the heating temperature and heating time are set as described above, the crystal growth of silicon in the particles of silicon compound may be suppressed, and the cycle retention rate may be prevented from degrading.

Furthermore, the heating is preferably performed under an inert gas atmosphere or an air atmosphere. When the heating is performed under the atmosphere like this, a negative electrode capable of more improving the first time charge/discharge efficiency may be produced.

The negative electrode containing the particles of lithium-containing silicon compound produced according to the production method of the negative electrode of the present invention is a silicon-based active material mainly made of a silicon compound, therefore, the battery capacity may be increased. Furthermore, the silicon compound is expressed by a general formula SiOx (here, $0.5 \leq x \leq 1.6$) and the particles of silicon compound contain lithium, therefore, the cycle characteristics may be improved. Furthermore, due to inclusion of lithium in the particles of silicon compound, at the time of first time charge/discharge of a battery containing the silicon-based active material, the irreversible capacity may be reduced.

Furthermore, according to the production method of a negative electrode of the present invention, by introducing thermal stabilizing process after Li insertion into the particles of silicon compound, an active Li chemical species generated at the time of the Li insertion may be stabilized. Thus, a negative electrode capable of improving the first time charge/discharge efficiency may be produced.

By the way, regarding the negative electrode obtained like this, a discharge capacity retention rate at $100^{th}$ cycle may be obtained as shown below. The discharge capacity retention rate at $100^{th}$ cycle may be evaluated with a coin cell. As the electrode, a negative electrode having a diameter of 14.5 mm prepared by the production method of negative electrode of the present invention and a lithium composite oxide nickel/manganese/cobalt positive electrode ($LiN_xM_yC_zO_2$) having a diameter of 13 mm may be used. As an electrolytic solution, a solution in which $LiPF_6$ is dissolved at a concentration of 1 mol/l in a mixed solvent of ethylene carbonate and ethyl methyl carbonate (mixed at 3:7 by volume ratio) may be used. As the separator, a polypropylene porous film having a diameter of 16 mm, and a film thickness of 25 μm may be used.

After leaving the coin cell at 25° C. for 24 hours, at a measurement temperature of 25° C., constant current charge is performed until reaching 4.2 V at 1 C, and, after a battery voltage reached 4.2 V, charge is performed until a charge current becomes 0.2 C at a constant voltage of 4.2 V. Next, after the coin cell after discharge is left for 10 minutes, discharge is performed until the battery voltage becomes 2.7 V at a constant current of 1 C, and an electric quantity flowed this time is obtained as discharge capacity at the $1^{st}$ cycle. With this charge/discharge as one cycle, the charge/discharge are repeated 100 times, and an electric quantity flowed at the time of discharge at the $100^{th}$ time is obtained as discharge capacity at the 100th cycle. A discharge capacity retention rate at the $100^{th}$ cycle is calculated from the following formula.

Capacity retention rate (%)=(discharge capacity at the $100^{th}$ cycle/discharge capacity at the $1^{st}$ cycle)×100

(3. Production Method of Non-aqueous Electrolyte Secondary Battery)

Next, a method of producing a non-aqueous electrolyte secondary battery with a negative electrode active material produced according to the production method of a negative electrode active material of the present invention or a negative electrode produced according to a production method of a negative electrode of the present invention will be described. As one example of this method, a method in which a negative electrode active material for non-aqueous electrolyte secondary battery is produced according to a production method of a negative electrode active material for non-aqueous electrolyte secondary battery of the present invention shown in FIG. 1, and a non-aqueous electrolyte secondary battery is produced with an electrode containing the negative electrode active material for non-aqueous electrolyte secondary battery may be used. Furthermore, as another example of the method, a method in which a negative electrode for non-aqueous electrolyte secondary battery is produced according to a production method of a negative electrode for non-aqueous electrolyte secondary battery of the present invention shown in FIG. 4, and a non-aqueous electrolyte secondary battery is produced with the negative electrode may be used. In what follows, a production method of a non-aqueous electrolyte secondary battery will be detailed with a case where a laminate film type lithium ion secondary battery (hereinafter, also called as a laminate film type secondary battery) is produced as an example.

(Structure of Laminate Film Type Secondary Battery)

A laminate film type secondary battery 30 shown in FIG. 3 houses a wound electrode body 31 mainly inside a sheet-like exterior member 35. The wound electrode body 31 has a separator between a positive electrode and a negative electrode and is formed by winding. Furthermore, there is a case where the positive electrode and the negative electrode have a separator therebetween and house a laminate body. In either of electrode bodies, a positive electrode lead 32 is attached to the positive electrode, and a negative electrode lead 33 is attached to the negative electrode. An outermost peripheral part of the electrode body is protected by a protective tape.

The positive and negative electrode leads are led in one direction, for example, from the inside of the exterior member 35 toward an outside thereof. The positive electrode lead 32 is made of an electrically conductive material such as aluminum or the like, and the negative electrode lead 33 is made of an electrically conductive material such as nickel or copper.

The exterior member 35 is a laminate film in which, for example, a fusion layer, a metal layer, and a surface protective layer are laminated in this order, and, the laminate film has outer peripheral parts fused with each other or adhered by an adhesive in fusion layers of two sheets of film such that the fusion layers may face with the wound electrode body 31. The fusion part is a film such as polyethylene or polypropylene, and the metal part is an aluminum foil or the like. The protective layer is, for example, nylon or the like.

An adhesive film 34 is inserted between the exterior member 35 and the positive and negative electrode leads to prevent ambient air from intruding. The material is, for example, a polyethylene, polypropylene, or polyolefin resin.

(Positive Electrode)

A positive electrode has a positive electrode active material layer on both sides or on one side of the positive electrode current collector in the same manner as in the negative electrode 10 of, for example, FIG. 2.

The positive electrode current collector is made of an electrically conductive material such as aluminum.

A positive electrode active material layer contains any one or more kinds of positive electrode materials capable of absorbing/releasing lithium ions, and, may contain other materials such as a binder, a conductive assistant, and a dispersant depending on a design. In this case, details of the binder and the conductive assistant are the same as, for example, in the negative electrode binder and the negative electrode conductive assistant described above.

As the positive electrode material, a Li-containing compound is desirable. As the Li-containing compound, a composite oxide made of, for example, lithium and a transition metal element, or a phosphate compound having the Li and the transition metal element may be used. Among these positive electrode materials, compounds containing at least one or more kinds of nickel, iron, manganese, and cobalt are preferred. Chemical formulas for these are expressed by, for example, $Li_xM_1O_2$ or $Li_yM_2PO_4$. In the formulas, $M_1$ and $M_2$ express at least one or more kinds of the transition metal elements. Values of "x" and "y" show different values depending on a battery charge/discharge state, but, are generally shown by $0.05 \le x \le 1.10$ and $0.05 \le y \le 1.10$.

As the composite oxide containing the lithium and the transition metal element, for example, a lithium-cobalt composite oxide ($Li_xCoO_2$), a lithium-nickel composite oxide ($Li_xNiO_2$) may be used. As the phosphate compound having the lithium and the transition metal element, for example, a lithium-iron phosphate compound ($LiFePO_4$) or a lithium-iron-manganese phosphate compound ($LiFe_{1-u}Mn_uPO_4$ ($0<u<1$)) may be used. This is because when these positive electrode materials are used, high battery capacity is obtained and excellent cycle characteristics is also obtained.

(Negative Electrode)

A negative electrode has the same structure as the negative electrode 10 of the FIG. 2, and has a negative electrode active material layer 12 on, for example, both sides of the current collector 11. The negative electrode preferably has a negative electrode charge capacity larger than an electric capacity (charge capacity as a battery) obtained from a positive electrode active material agent. This is because the precipitation of the lithium metal on the negative electrode may be suppressed. The negative electrode may be prepared also via a method shown in FIG. 1 or may be prepared also by a method shown in FIG. 4.

The positive electrode active material layer is provided on a part of both sides of the positive electrode current collector, and the negative electrode active material layer is also provided on a part of both sides of the negative electrode current collector. In this case, the negative electrode active material layer provided on, for example, the negative electrode current collector is provided on a region where an opposing positive electrode active material layer is not present. This is because stable battery design is carried out.

A non-facing region, that is, a region where the negative electrode active material layer and the positive electrode active material layer do not face each other is hardly influenced by the charge/discharge. Therefore, a state of the negative electrode active material layer just immediately after the formation is maintained. Thereby, a composition of the negative electrode active material or the like may be accurately investigated with excellent reproducibility irrespective of the presence or absence of the charge/discharge.

(Separator)

A separator separates the positive electrode and the negative electrode and allows passage of lithium ions while preventing current short-circuit accompanying the contact of both electrodes from occurring. The separator is formed of a porous film made of, for example, a synthetic resin, or ceramic, and may have a laminate structure in which two or more kinds of porous films are laminated. Examples of the synthetic resin include polytetrafluoroethylene, polypropylene, or polyethylene.

(Electrolytic Solution)

At least a part of the active material layer or the separator is impregnated with a liquid electrolyte (electrolytic solution). The electrolytic solution has an electrolyte salt dissolved in a solvent and may contain other materials such as an additive or the like.

As the solvent, for example, a non-aqueous solvent may be used. Examples of the non-aqueous solvents include ethylene carbonate, propylene carbonate, butylene carbonate, dimethyl carbonate, diethyl carbonate, ethyl methyl carbonate, methyl propyl carbonate, 1,2-dimethoxy ethane, and tetrahydrofuran.

Among these, it is desirable to use at least one or more kinds of ethylene carbonate, propylene carbonate, dimethyl carbonate, diethyl carbonate, and ethyl methyl carbonate.

This is because more excellent characteristics may be obtained. Furthermore, in this case, more advantageous characteristics may be obtained by combining a high viscosity solvent such as ethylene carbonate or propylene carbonate and a low viscosity solvent such as dimethyl carbonate, ethyl methyl carbonate or diethyl carbonate. This is because dissociability or ionic mobility of the electrolyte salt is improved.

It is preferable to contain an unsaturated carbon bond cyclic carbonate ester as a solvent additive. This is because a stable film is formed on a surface of the negative electrode during charge/discharge to be able to suppress a decomposition reaction of the electrolytic solution. Examples of the unsaturated carbon bond cyclic carbonate ester include, for example, vinylene carbonate and vinyl ethylene carbonate.

Furthermore, it is preferable to contain a sultone (cyclic sulfonic acid ester) as the solvent additive. This is because the chemical stability of the battery is improved. Examples of the sultone include propane sultone and propene sultone.

Furthermore, the solvent preferably contains an acid anhydride. This is because the chemical stability of the electrolytic solution is improved. As the acid anhydride, for example, propane disulfonic anhydride may be used.

The electrolyte salt may contain any one or more kinds of light metal salts such as lithium salts. As the lithium salt, for example, the following materials may be used. Lithium hexafluorophosphate ($LiPF_6$), lithium tetrafluoroborate ($LiBF_4$) or the like may be used.

A content of the electrolyte salt is preferably 0.5 mol/kg or more and 2.5 mol/kg or less relative to the solvent. This is because high ionic conductivity is obtained.

(Production Method of Laminate Film Type Secondary Battery)

At the beginning, a positive electrode is prepared with the positive electrode material described above. First, a positive electrode mixture is formed by mixing the positive electrode active material and, as needs arise, a binder and a conductive assistant, followed by dispersing in an organic solvent to form a positive electrode mixture slurry. Subsequently, the mixture slurry is coated on the positive electrode current collector by a coating device such as a knife roll or a die coater with a die head and dried with hot air to obtain a positive electrode active material layer. At the end, the positive electrode active material layer is compression molded by a roll press machine or the like. At this time, heating may be applied. Furthermore, compression, heating may be repeated a plurality of times.

Next, by using the same operation procedure as in the preparation of the negative electrode 10, the negative electrode active material layer is formed on the negative electrode current collector to form a negative electrode (see FIG. 2).

The positive electrode and the negative electrode are prepared according to the same preparation procedure as in the above. In this case, each active material layer is formed on both sides of the positive electrode and negative electrode current collectors. At this time, as shown in FIG. 2, in any of the electrodes, active material coating lengths on the both surface parts may be displaced.

Subsequently, an electrolytic solution is prepared. Further subsequently, by using ultrasonic welding or the like, the positive electrode lead 32 of FIG. 3 is attached to the positive electrode current collector and the negative electrode lead 33 is attached to the negative electrode current collector. Then, the positive electrode and the negative electrode are laminated via the separator, or are wound to prepare a wound electrode body, followed by adhering a protective tape to the outermost peripheral part thereof. Next, the wound electrode body is molded into a flat shape. Then, after inserting the wound electrode body between folded film-like exterior member 35, insulation parts of the exterior member are adhered with each other by a thermal fusion method, and with only one direction opened, the wound electrode body is encapsulated. Then, an adhesive film 34 is inserted between the positive electrode lead 32, and the negative electrode lead 33 and the exterior member 35. A predetermined amount of the above prepared electrolytic solution is charged from a releasing part, followed by vacuum impregnation. After the impregnation, the releasing part is adhered by a vacuum thermal fusion method.

As was described above, the laminate film type secondary battery 30 may be produced.

EXAMPLES

In what follows, the present invention will be more specifically described with reference to Examples and Comparative Examples of the present invention. However, the present invention is not limited to these examples.

Example 1-1

At first, a silicon-based active material was prepared as shown below.

First, a raw material (a vaporization starting material) obtained by mixing metallic silicon and silicon dioxide was set in a reaction furnace, was vaporized in an atmosphere of a vacuum of 10 Pa and deposited on an absorption plate, and, after sufficiently cooling, a deposit (SiOx: x=0.5) was taken out and pulverized by a jet mill. After that, the thermal CVD with methane gas was performed to coat a carbon coating film on a surface of particles of a silicon compound.

By the way, as shown also in the following Table 1, in the particles of silicon compound after the generation of a carbon coating film, a crystallite size of silicon calculated from a half value width of a diffraction peak due to a Si(111) crystal plane obtained from X-ray diffractometry was 3.77 nm. Furthermore, a coating amount of carbon was 5% by mass relative to the particles of silicon compound.

Subsequently, the particles of silicon compound after the coating with the carbon coating film were soaked in a solution (solution $A_1$) in which a lithium piece and biphenyl were dissolved in tetrahydrofuran (hereinafter, referred to also as THF). A solution $A_1$ of Example 1-1 was prepared by adding a lithium piece of a mass portion of 10% by mass relative to a mixed solution of the THF and biphenyl after dissolving biphenyl in the THF solvent at a concentration of 1 mol/L. Furthermore, a temperature of the solution when the particles of silicon compound are soaked was set to 20° C. and a soaking time was set to 10 hours. After that, the particles of silicon compound were filtered. According to the above procedure, lithium was inserted into the particles of silicon compound.

Next, the particles of silicon compound after the lithium insertion were soaked in a solution (solution B) in which naphthalene was dissolved in THF. The solution B of Example 1-1 was prepared by dissolving naphthalene in the THF solvent at a concentration of 2 mol/L. Furthermore, a temperature of the solution when the particles of silicon compound are soaked was set to 20° C. and the soaking time was set to 20 hours. After that, the particles of silicon compound were filtered.

Next, the prepared particles of lithium-containing silicon compound were heated at a maximum temperature of 400°

C. in an Ar atmosphere, followed by washing, further followed by drying the particles of lithium-containing silicon compound after the washing treatment under reduced pressure. As was described above, a silicon-based active material (particles of silicon-based active material) was produced.

Subsequently, a test cell made of an electrode containing the silicon-based active material produced as described above and a counter electrode lithium was prepared, and the first time charge/discharge characteristics in the first time charge/discharge were investigated. In this case, a 2032 type coin cell was assembled as the test cell.

An electrode containing particles of the silicon-based active material was prepared as shown below. First, graphite, particles of the prepared silicon-based active material, a conductive assistant 1 (carbon nanotube, CNT), a conductive assistant 2 (carbon fine particles having a median diameter of about 50 nm), a conductive assistant 3 (flake-like graphite), a styrene-butadiene rubber (styrene-butadiene copolymer, hereinafter referred to as SBR) and carboxymethylcellulose (hereinafter referred to as CMC) were mixed at a dry mass ratio of 82:9:1.5:1:1:2.5:3, followed by diluting with pure water to prepare a negative electrode mixture slurry. That is, a mass ratio of graphite mixed as the active material and the silicon-based active material was about 9:1. By the way, the SBR and CMC are a negative electrode binder. Subsequently, the mixture slurry was coated on both sides of the current collector by using a coating machine and dried. As the current collector, an electrolytic copper foil (thickness: 20 μm) was used. At the end, the firing was applied at 90° C. for 1 hour in a vacuum atmosphere. Thus, the negative electrode active material layer was formed.

An electrolytic solution of the test cell was prepared as shown below. After solvents (4-fluoro-1,3-dioxolan-2-one (FEC), ethylene carbonate (EC) and dimethyl carbonate (DMC)) were mixed, an electrolyte salt (lithium hexafluorophosphate: $LiPF_6$) was dissolved therein to prepare an electrolytic solution. In this case, a composition of the solvent was set to FEC:EC:DMC=10:20:70 by volume ratio, and a content of the electrolyte salt was set to 1.0 mol/kg relative to the solvent.

As the counter electrode, a metal lithium foil having a thickness of 0.5 mm was used. Furthermore, as the separator, polyethylene having a thickness of 20 μm was used.

Subsequently, a bottom lid, a lithium foil, and the separator of a 2032 type coin battery were superposed, 150 mL of the electrolytic solution was charged, subsequently, the negative electrode and a spacer (thickness: 1.0 mm) were superposed, 150 mL of the electrolytic solution was charged, subsequently, a spring and a top lid of the coin battery were assembled, followed by caulking with an automatic coin cell caulking machine to prepare a 2032 type coin cell.

Subsequently, the prepared 2032 type coin battery was charged under a constant current density of 0.2 $mA/cm^2$ until reaching 0.0 V, and at the stage where the voltage reached 0.0 V, charge was performed until the current density reaches 0.02 $mA/cm^2$ at the constant voltage of 0.0 V, and during discharge, the discharge was performed until the voltage reaches 1.2 V under the constant current density of 0.2 $mA/cm^2$. Then, the first time charge/discharge characteristics in this first time charge/discharge were investigated. By the way, as the first time charge/discharge characteristics, first time efficiency (initial efficiency) (%)=(first time discharge capacity/first time charge capacity)×100 was calculated.

Subsequently, in order to evaluate the cycle characteristics of a non-aqueous electrolyte secondary battery that uses the negative electrode active material produced by the production method of the negative electrode active material of the present invention, a laminate film type secondary battery 30 such as shown in FIG. 3 was prepared as shown below.

First, a positive electrode that is used in the laminate film type secondary battery was prepared. A positive electrode mixture was prepared by mixing 95 parts by mass of $LiCoO_2$ that is lithium-cobalt composite oxide as a positive electrode active material, 2.5 parts by mass of a positive electrode conductive assistant (acetylene black), and 2.5 pats by mass of a positive electrode binder (polyvinylidene fluoride: PVDF). Subsequently, the positive electrode mixture was dispersed in an organic solvent (N-methyl-2-pyllolydone: NMP) to form a paste-like slurry. Subsequently, the slurry was coated on both sides of a positive electrode current collector with a coating machine having a die head, followed by drying with a hot air type dryer. At this time, the positive electrode current collector having a thickness of 15 μm was used. At the end, a roll press was used to perform compression molding.

As a negative electrode, one prepared in the same procedure as in the electrode containing the silicon-based active material of the test cell was used.

As an electrolytic solution, one prepared in the same procedure as in the electrolytic solution of the test cell was used.

Next, a laminate film-type lithium ion secondary battery was assembled as shown below. At the beginning, an aluminum lead was ultrasonically welded to one end of the positive electrode current collector, and a nickel lead was welded to one end of the negative electrode current collector. Subsequently, the positive electrode, the separator, the negative electrode, and the separator were laminated in this order, and wound in the longitudinal direction to obtain a wound electrode body. A winding end part thereof was fixed with a PET protective tape. As the separator, a laminate film (thickness: 12 μm) in which a film having a porous polyethylene as a main component is sandwiched by films having a porous polypropylene as a main component was used. Subsequently, after sandwiching the electrode body between the exterior members, outer periphery parts excluding one side were thermally fused each other and the electrode body was housed inside thereof. As the exterior member, an aluminum laminated film in which a nylon film, an aluminum foil, and a polypropylene film are laminated was used. Subsequently, the prepared electrolytic solution was charged from an opening part and impregnated under a vacuum atmosphere, followed by the thermal fusion to seal.

The cycle characteristics (retention rate %) of thus prepared laminate film-type lithium ion secondary battery were investigated.

The cycle characteristics were investigated as shown below. At the beginning, two cycles of charge/discharge were carried out under the atmosphere of 25° C. for stabilizing the battery, and a discharge capacity at the $2^{nd}$ cycle was measured. Subsequently, the charge/discharge was performed until a total number of cycles becomes 100 cycles, and the discharge capacity was measured at each cycle. At the end, a capacity retention rate was calculated by dividing the discharge capacity at the $100^{th}$ cycles by the discharge capacity at the $2^{nd}$ cycle (multiplied by 100 for % expression). As the cycle condition, charge was performed at a constant current density of 2.5 $mA/cm^2$ until reaching 4.3 V, and at the stage of reaching 4.3 V, charge was performed at a constant voltage of 4.3 V until the current density reaches 0.25 $mA/cm^2$. Furthermore, during the discharge, the discharge was performed until the voltage reaches 3.0 V at a constant current density of 2.5 mA/cm².

Examples 1-2 to 1-5, Comparative Examples 1-1 and 1-2

Each negative electrode active material (silicon-based active material) was prepared in the same manner as in Example 1-1 except that x in the SiOx was varied. And, the battery characteristics were evaluated in the same manner as in Example 1-1.

When the first time charge/discharge characteristics of the test cells (coin batteries) and the capacity retention rate of the laminate film-type secondary batteries, which were prepared in Examples 1-1 to 1-5 and Comparative Examples 1-1 and 1-2 are investigated, results shown in Table 1 were obtained. By the way, the first time discharge capacity of Example 1-3 was 1360 mAh/g. By the way, in Tables 1 to 5, the Li insertion by soaking and the contacting with the solution B (deactivation of oxidant) are described by summarizing as a Li solution method.

TABLE 1

Si (111) crystallite 3.77 nm, coating amount of carbon: 5% by mass, process Li solution method (Li insertion/oxidant deactivation)→heating method, heating temperature: 400° C., binder: CMC/SBR, active material: graphite/SiOx = 9/1 (by mass ratio), electrolytic solution: FEC:EC:DMC (1:2:7 by volume %) $LiPF_6$ 1.0 mol/kg, positive electrode $LiCoO_2$

| Table 1 | SiOx(X=) | Capacity Retention Rate at the 100$^{th}$ Cycle (%) | First Time Efficiency (%) |
|---|---|---|---|
| Comparative Example 1-1 | 0.3 | 61.2 | 84.5 |
| Example 1-1 | 0.5 | 77.2 | 88.1 |
| Example 1-2 | 0.7 | 79.3 | 88.8 |
| Example 1-3 | 0.9 | 80.7 | 89.1 |
| Example 1-4 | 1.2 | 79.6 | 88.6 |
| Example 1-5 | 1.45 | 78.8 | 87.8 |
| Comparative Example 1-2 | 1.8 | 74.7 | 86.7 |

As shown in Table 1, the battery characteristics were degraded when a value of "x" is outside of the range of 0.5≤x≤1.6 in a silicon compound expressed by SiOx. For example, when oxygen is not sufficient (x=0.3) as shown in Comparative Example 1-1, the capacity retention rate of the secondary battery was remarkably degraded. On the other hand, when an amount of oxygen is excessive as shown in Comparative Example 1-2 (x=1.8), the electric conductivity of the silicon compound was degraded to result in a decrease in the capacity retention rate of the secondary battery.

Example 2-1, Comparative Examples 2-1 to 2-5

Each negative electrode active material was prepared in the same manner as in Example 1-3 except that presence or absence of the contacting with the solution B, presence or absence of the heating, and presence or absence of the carbon coating film of the particles of silicon compound were varied. And, in the same manner as in Example 1-3, the battery characteristics were evaluated. In Comparative Example 2-1, the Li insertion, the contacting with the solution B and the heating (heating method) were not applied. In Comparative Example 2-2, after carrying out the Li insertion by contacting and the contacting with the solution B, the heating was not applied. By the way, the contact method of Comparative Example 2-2 is a method of making a Li metal and the Si compound contact. In Comparative Example 2-3, the Li insertion and the contact with the solution B were not applied, only the thermal step was applied. In Comparative Example 2-4, after the Li insertion by soaking and the contacting with solution B were performed, the thermal step was not applied. In Comparative Example 2-5, after the thermal step, the Li insertion by soaking and the contacting with the solution B were applied.

When the first time charge/discharge characteristics of the test cells and the capacity retention rate of laminate film-type secondary batteries of Example 2-1 and Comparative Examples 2-1 to 2-5 were investigated, results shown in Table 2 were obtained. By the way, in the following Tables 2 to 6, the results of the Example 1-3 are described together.

TABLE 2

SiOx (X = 0.9), Si (111) crystallite 3.77 nm, binder: CMC/SBR, active material: graphite/SiO = 9/1 (by mass ratio), electrolytic solution: FEC:EC:DMC (1:2:7 by volume %) $LiPF_6$ 1.0 mol/kg, positive electrode $LiCoO_2$

| Table 2 | Order of the Li insertion, the Li release, and the heating | Carbon coating film (% by mass) | Capacity Retention Rate at the 100$^{th}$ Cycle (%) | First Time Efficiency (%) |
|---|---|---|---|---|
| Comparative Example 2-1 | — | 5 | 77.5 | 86.5 |
| Comparative Example 2-2 | Only the contact method and oxidant deactivation | 5 | 78.0 | 87.2 |
| Comparative Example 2-3 | Only the heating | 5 | 77.5 | 86.5 |
| Comparative Example 2-4 | Only the Li solution method (Li insertion/oxidant deactivation) | 5 | 77.9 | 87.1 |
| Example 1-3 | Li solution method→heating method | 5 | 80.7 | 89.1 |
| Comparative Example 2-5 | Heating method→Li solution method | 5 | 78.0 | 87.2 |
| Example 2-1 | Li solution method→heating method | — | 78.8 | 87.9 |

As obvious from Table 2, when the thermal step was not applied after the Li insertion (Comparative Examples 2-2 and 2-4), an improvement in the first time efficiency (initial efficiency) was insufficient. Furthermore, also when the heating method was applied first and the Li solution doping was followed (Comparative Example 2-5), an improvement in the first time efficiency was insufficient. In these Comparative Examples, after the Li solution doping, generated active Li chemical species was not deactivated, the slurry became low viscosity and the peel strength of the negative electrode was degraded to result in insufficient improvement of the first time efficiency. Furthermore, in Comparative Examples 2-1 and 2-3, since the Li insertion was not applied, an improvement in the first time efficiency was insufficient. Furthermore, when the carbon coating film was contained, the capacity retention rate and first time efficiency showed excellent results. This is because an increase in the powder resistivity due to the Li insertion is suppressed by the carbon coating film.

Examples 3-1 to 3-8

Each negative electrode active material was prepared in the same manner as in Example 1-3 except that the crystallinity of the particles of silicon compound prepared before the Li insertion was varied. And, in the same manner as in Example 1-3, the battery characteristics were evaluated.

When the first time charge/discharge characteristics of the test cells (coin battery) and the capacity retention rate of laminate film-type secondary batteries prepared in Examples 3-1 to 3-8 were investigated, results shown in Table 3 were obtained.

TABLE 3

SiOx (X = 0.9), coating amount of carbon: 5% by mass, process Li solution method (Li insertion/oxidant deactivation)→heating method, heating temperature: 400° C., binder: CMC/SBR, active material: graphite/SiO = 9/1 (by mass ratio), electrolytic solution: FEC:EC:DMC (1:2:7 by volume %) LiPF$_6$ 1.0 mol/kg, positive electrode LiCoO$_2$

| Table 3 | Half Value Width θ | Si (111) Crystallite Size (nm) | Capacity Retention Rate at the 100$^{th}$ Cycle (%) | First Time Efficiency (%) |
|---|---|---|---|---|
| Example 3-1 | 0.756 | 11.42 | 79.8 | 88.7 |
| Example 3-2 | 0.796 | 10.84 | 79.9 | 88.9 |
| Example 3-3 | 1.025 | 8.55 | 80.1 | 89.0 |
| Example 3-4 | 1.218 | 7.21 | 80.4 | 89.1 |
| Example 3-5 | 1.845 | 4.62 | 80.6 | 89.1 |
| Example 1-3 | 2.257 | 3.77 | 80.7 | 89.1 |
| Example 3-6 | 2.593 | 3.29 | 80.7 | 89.0 |
| Example 3-7 | 10.123 | 1.524 | 80.8 | 88.7 |
| Example 3-8 | 20.221 | 0 * | 80.8 | 88.4 |

As obvious from Table 3, when the crystallinity of the particles of silicon compound was varied, excellent battery characteristics were obtained in the range of the Si (111) crystal size of 3 nm or more and 10 nm or less. When the crystallite size is 10 nm or less, the capacity retention rate increases because expansion and contraction of the particles of silicon compound accompanying the charge/discharge become smaller. When the crystallite size is 3 nm or more, an improvement rate of the first time efficiency due to the Li insertion becomes sufficient. Accordingly, by setting the crystallite size in the range, the capacity retention rate and first time efficiency may be improved. By the way, in Example 3-8, a peak of a Si(111) plane was broad, and a fine region of silicon was substantially amorphous.

Examples 4-1 to 4-5

Each negative electrode active material was prepared in the same manner as in Example 1-3 except that a lithium insertion amount into the particles of silicon compound was varied. And, in the same manner as in Example 1-3, the battery characteristics were evaluated.

When the first time charge/discharge characteristics of the test cells (coin battery) and the capacity retention rate of laminate film-type secondary batteries prepared in Examples 4-1 to 4-5 were investigated, results shown in Table 3 were obtained.

TABLE 4

SiOx (X = 0.9), Si (111) crystallite 3.77 nm, coating amount of carbon: 5% by mass, process Li solution method→heating method, heating temperature: 400° C., binder: CMC/SBR, active material: graphite/SiO = 9/1 (by mass ratio), electrolytic solution: FEC:EC:DMC (1:2:7 by volume %) LiPF$_6$ 1.0 mol/kg, positive electrode LiCoO$_2$

| Table 4 | Li Content (% by mass) | First Time Discharge Capacity (mAh/g) | Capacity Retention Rate at the 100$^{th}$ Cycle (%) | First Time Efficiency (%) |
|---|---|---|---|---|
| Example 4-1 | 3.5 | 1560 | 78.8 | 87.6 |
| Example 4-2 | 4.8 | 1540 | 80.1 | 88.5 |
| Example 4-3 | 10.8 | 1480 | 80.3 | 88.9 |
| Example 1-3 | 13.5 | 1360 | 80.7 | 89.1 |
| Example 4-4 | 24.6 | 1100 | 80.2 | 89.8 |
| Example 4-5 | 32.1 | 990 | 79.8 | 90.2 |

As obvious from Table 4, when the lithium content is 4% by mass or more, the first time efficiency was sufficiently improved. Furthermore, when the lithium content is 30% by mass or less, a non-aqueous electrolyte secondary battery having high initial time discharge capacity of 1000 mAh/g or more may be produced. Accordingly, for achieving a balance between the first time efficiency and the first time discharge capacity, it is preferable to adjust the lithium content therebetween.

Examples 5-1 to 5-17

Each negative electrode active material was prepared in the same manner as in Example 1-3 except that an aromatic compound species of the solution A containing Li, a solvent species, a concentration of the aromatic compound, a soaking time into the solution A and a temperature of the solution A were varied as shown in Table 5. And, the battery characteristics were evaluated in the same manner as in Example 1-3.

Comparative Example 5-1

In Comparative Example 5-1, an ether-based solvent was not used in the solution A. A negative electrode active material was prepared in the same manner as in Example 1-3 other than this. And, the battery characteristics were evaluated in the same manner as in Example 1-3.

When the first time charge/discharge characteristics of the test cells (coin battery) and the capacity retention rate of laminate film-type secondary batteries prepared in Examples 5-1 to 5-17 and Comparative Example 5-1 were investigated, results shown in Table 5 were obtained.

TABLE 5

SiOx (X = 0.9), Si (111) crystallite 3.77 nm, coating amount of carbon: 5% by mass, process Li solution method (Li insertion/oxidant deactivation) → heating method, heating temperature: 400° C., binder: CMC/SBR, active material: graphite/SiO = 9/1 (by mass ratio), electrolytic solution: FEC:EC:DMC (1:2:7 by volume %) LiPF$_6$ 1.0 mol/kg, positive electrode LiCoO$_2$

| Table 5 | Aromatic Compound Species | Solvent | Concentration (mol/L) | Soaking Time | Reaction Temperature (° C.) | Capacity Retention Rate at the 100$^{th}$ Cycle (%) | First Time Efficiency (%) |
|---|---|---|---|---|---|---|---|
| Example 1-3 | Biphenyl | THF | 1 | 10 hours | 20 | 80.7 | 89.1 |
| Example 5-1 | Naphthalene | THF | 1 | 20 hours | 20 | 80.5 | 88.9 |
| Example 5-2 | Phenanthrene | THF | 1 | 20 hours | 20 | 80.2 | 88.5 |
| Example 5-3 | Biphenyl | Diethyl ether | 1 | 10 hours | 20 | 80.5 | 89.1 |
| Example 5-4 | Biphenyl | Tert-butyl methyl ether | 1 | 10 hours | 20 | 79.8 | 88.4 |
| Example 5-5 | Biphenyl | THF | $1.0 \times 10^{-4}$ | 20 hours | 20 | 80.1 | 88.9 |
| Example 5-6 | Biphenyl | THF | $1.0 \times 10^{-3}$ | 10 hours | 20 | 80.6 | 89.1 |
| Example 5-7 | Biphenyl | THF | 4.5 | 10 hours | 20 | 80.2 | 89.0 |
| Example 5-8 | Biphenyl | THF | 6 *1 | 20 hours | 20 | 80.1 | 88.6 |
| Example 5-9 | Biphenyl | THF | 1 | 10 hours | 50 | 80.6 | 89.0 |
| Example 5-10 | Biphenyl | THF | 1 | 10 hours | −20 | 80.2 | 88.9 |
| Example 5-11 | Biphenyl | THF | 1 | 50 hours | 20 | 80.6 | 89.2 |
| Example 5-12 | Biphenyl | THF | 1 | 100 hours | 20 | 80.6 | 89.2 |
| Example 5-13 | Biphenyl | THF | 1 | 200 hours | 20 | 80.6 | 89.2 |
| Example 5-14 | Biphenyl | THF | 1 | 1 minute | 20 | 78.5 | 88.1 |
| Example 5-15 | Biphenyl | THF | 1 | 5 minutes | 20 | 78.8 | 88.4 |
| Example 5-16 | — | Ethylene diamine (solute) and THF | 1 (Ethylene diamine) | 10 hours | −20 | 79.8 | 88.2 |
| Example 5-17 | — | Diglyme | Diglyme | 20 hours | 150 | 80 | 88.5 |
| Comparative Example 5-1 | Biphenyl | Nitrobenzene | Nitrobenzene | 10 hours | 20 | 77.4 | 86.7 |

In the inserting Li by soaking, the particles of silicon compound are brought into contact with the solution A that contains lithium and has an ether-based solvent as a solvent to obtain particles of lithium-containing silicon compound. In this step, it is preferable to use the solution A$_1$ that contains lithium and a straight chain polyphenylene compound, or a solution A$_2$ that contains lithium and amines as the solution A that contains lithium, among these, it is particularly preferable to use the solution A. This is because the solution A$_1$ may be handled in the vicinity of room temperature. Furthermore, in particular, when Examples 1-3, 5-1, and 5-2 are compared, the battery characteristics were more improved when biphenyl was used as the straight chain polyphenylene compound. This is because the lithium insertion into the particles of silicon compound is maintained at a higher speed because a complex generated by a reaction between the lithium and biphenyl is highly active and stable.

Furthermore, when the ether-based solvent is used, the battery characteristics were improved than Comparative Example 5-1 where the ether-based solvent was not used. This is because since the complex between the lithium and the straight chain polyphenylene compound or the like may be present stable in the ether-based solvent, the lithium insertion into the particles of silicon compound is easily maintained. Furthermore, the battery characteristics were more improved when diethyl ether or tert-butyl methyl ether was used as the ether-based solvent (Examples 5-3 and 5-4) than when THF was used (Example 1-3). This is because the lithium insertion into the particles of silicon compound is easily maintained because in the THF having relatively high dielectric constant among the ether-based solvents, the complex between the lithium and the straight chain polyphenylene compound or the like is present particularly stable.

Furthermore, a total concentration of the straight chain polyphenylene compounds and so on in the solution A is preferably from 10$^{-3}$ mol/L to 5 mol/L. Compared with the case where the total concentration of the straight chain polyphenylene compounds and so on in the solution A is lower than 10$^{-3}$ mol/L like in Example 5-5, in the case where the total concentration of the straight chain polyphenylene compounds and so on in the solution A is 10$^{-3}$ mol/L or more and 5 mol/L or less (for example, Examples 1-3, 5-6 and 5-7), the retention rate and first time efficiency are improved. This is because the lithium insertion into the particles of silicon compound proceeded more efficiently. Furthermore, when compared with the case where the total concentration of the straight chain polyphenylene compounds and so on exceeds 5 mol/L like in example 5-8, in the case where the total concentration of the straight chain polyphenylene compounds and so on is 10-3 mol/L or more and 5 mol/L or less, the retention rate and initial efficiency are improved. This is because when the negative electrode active material was formed into a non-aqueous electrolyte secondary battery, a reaction residue did not elute into the electrolytic solution and degradation of the battery characteristics due to the side reaction could be suppressed. By the way, in Example 5-8, the biphenyl partially remained without being dissolved.

Furthermore, a temperature of the solution A is preferable to be close to 20° C. A reaction rate of the lithium insertion reaction into the particles of silicon compound is improved because when the temperature of the solution A is close to 20° C., a decrease in the reaction speed is difficult to occur and precipitation of a lithium compound due to the side reaction is difficult to occur. Therefore, compared with the case where the temperature of the solution A is higher or less than 20° C. like in Examples 5-9 and 5-10, an example where the temperature of the solution is 20° C. (for example, Example 1-3) had more excellent battery characteristics.

Furthermore, the contact time of the powder of silicon compound and the solution A is desirably 3 minutes or more and 100 hours or less. When the contact time is 3 minutes or more (for example, Example 5-15), compared with the case shorter than 3 minutes (Example 5-14), the lithium insertion into the particles of silicon compound sufficiently occurs. Furthermore, around the time when the contact time reaches 100 hours, the lithium insertion into the particles of silicon compound comes to a substantial equilibrium state.

Examples 6-1 to 6-5, Comparative Example 6-1

Each negative electrode active material was prepared in the same manner as in Example 1-3 except that the heating temperature (highest arrival temperature) during heating was varied. In Comparative Example 6-1, after the Li insertion by soaking, the contacting with the solution B and the thermal treatment were not applied. And, in the same manner as in Example 1-3, the battery characteristics were evaluated.

When the first time charge/discharge characteristics of the test cells (coin battery) and the capacity retention rate of laminate film-type secondary batteries prepared in Examples 6-1 to 6-5 were investigated, results shown in Table 6 were obtained.

TABLE 6

SiOx (X = 0.9), Si (111) crystallite 3.77 nm, coating amount of carbon: 5% by mass, binder: CMC/SBR, active material: graphite/SiO = 9/1 (by mass ratio), electrolytic solution: FEC:EC:DMC (1:2:7 by volume %) LiPF$_6$ 1.0 mol/kg, positive electrode LiCoO$_2$

| Table 6 | Heating Temperature (° C.) | Capacity Retention Rate at the 100$^{th}$ Cycle (%) | Initial Time Efficiency (%) |
|---|---|---|---|
| Example 6-1 | 100 | 80 | 88.6 |
| Example 6-2 | 150 | 80.3 | 89 |
| Example 1-3 | 400 | 80.7 | 89.1 |
| Example 6-3 | 600 | 80.5 | 89.2 |
| Example 6-4 | 800 | 80.4 | 89.1 |
| Example 6-5 | 900 | 79.8 | 89.1 |
| Comparative Example 6-1 | No heating | * | * |

* In Comparative Example 6-1, the slurry was overheated during negative electrode slurry preparation, electrode preparation after that was impossible.

As obvious from Table 6, the heating temperature (highest arrival temperature) is preferable to be in the range of from 150° C. to 800° C. for the battery characteristics. When the heating temperature is 150° C. or more, the active Li chemical species generated in the Li insertion step is sufficiently deactivated. Therefore, when a negative electrode slurry is prepared with the negative electrode active material containing the lithium chemical species like this, the slurry is suppressed from becoming low viscosity, and the peel strength of the negative electrode obtained with the negative electrode slurry is improved. Furthermore, when the heating temperature is 800° C. or less, the silicon crystal in the particles of silicon compound is suppressed from growing, the expansion/contraction during the charge/discharge becomes smaller to result in an improvement in the cycle characteristics.

Examples 7-1 to 7-9, Comparative Example 7-1

Contents of abbreviated names used in Examples 7-1 to 7-9 and Comparative Example 7-1 are shown below.
PAAH: polyacrylic acid
THF: tetrahydrofuran
BP: biphenyl
Measurement methods of various physical properties in Examples 7-1 to 7-9 and Comparative Example 7-1 are as shown below.
(Solid Content Concentration of PAAH)
PAAH (its mass is $w_1$) was heated at 150° C. for 60 minutes in a hot air dryer, and a mass after heat treatment (its mass is $w_2$) was measured. A solid content concentration (% by mass) was calculated by the following formula.

Solid content concentration (% by mass)=$(w_2/w_1)\times 100$ (Negative Electrode Capacity, First Time Charge/Discharge Efficiency)

The negative electrode capacity and first time charge/discharge efficiency were evaluated with a coin cell. As the electrode, a negative electrode having a diameter of 14.5 mm and a positive electrode made of a lithium foil having a diameter of 15 mm prepared in each of Examples and Comparative Example were used. As the electrolytic solution, a solution in which LiPF$_6$ was dissolved at a concentration of 1 mol/l in a mixed solvent of ethylene carbonate and ethyl carbonate (mixed at a volume ratio of 1:1) was used. As the separator, a polypropylene porous film having a diameter of 16 mm and a film thickness of 25 μm was used.

These coin cells were left at 25° C. for 24 hours, followed by constant current charge until 3 V is attained at 0.05 C at a measurement temperature of 25° C. After the constant current charge, first, these coin cells were left for 10 minutes, followed by constant current discharge up to 0.005 V, further followed by constant voltage discharge until 0.01 C is attained. Then, the discharged coin cells were left for 10 minutes, followed by constant current charge until 1.2 V is attained at 0.05 C in CC mode. A discharge capacity during the charge/discharge was taken as a capacity at the time of lithium insertion to the negative electrode, and charge capacity performed subsequently after the discharge was taken as a capacity at the time of lithium release. A first time charge/discharge efficiency was calculated according to the following formula.

First time charge/discharge efficiency=capacity at the time of lithium release/capacity at the time of lithium insertion×100

Example 7-1

(Preparation of Negative Electrode)
19.7 parts by mass (solid content 1.4 parts by mass) of a PAAH solution and 0.6 parts by mass of conductive assistant acetylene black (HS-100 manufactured by Denka Company Ltd.) were kneaded with a battery compounds stirrer (manufactured by PRIMIX Corporation, T. K. HIVIS MIX model 2P-03). To an obtained paste, a total of 18 parts by mass of silicon oxide (manufactured by Shin-Etsu Chemical Co., Ltd., KSC-1064) and carbon particles (graphite: manufactured by Hitachi Chemical Co., Ltd., MAGD-20) was added, H$_2$O was further added, followed by further kneading, thus a negative electrode mixture paste was prepared. A volume ratio of the silicon oxide and carbon particles that are an active material was set to 20:80.

The negative electrode mixture paste was coated on a Cu foil (thickness: 18 μm) as the current collector with an applicator, followed by heating for 5 minutes at 150° C. under a nitrogen atmosphere to cure. Thus, a negative electrode in which the current collector and a negative electrode mixture layer were laminated was obtained. A mass of the active material in the negative electrode mixture layer after drying was 4 mg/cm² a unit area.

(Lithium Pre-doping to Negative Electrode (Lithium Pre-doping to Particles of Silicon Compound contained in Negative Electrode))
(Pre-Doping Step)

BP of 0.2 mol/L concentration and a saturation amount of metallic Li were dissolved in THF. In the solution, the negative electrode prepared according to the above method was soaked at 25° C. for 10 minutes to pre-dope the Li into the negative electrode.

(Impurity Removing Step)

The negative electrode pre-doped with the Li was soaked in the THF for 1 minute, followed by pulling up and drying in vacuum for 5 minutes.

(Heat Treatment Step)

The negative electrode was heated in a dry air atmosphere at 60° C. for 30 minutes to obtain a doped negative electrode.

(Air Exposure and Drying Treatment of Doped Negative Electrode)

The doped negative electrode prepared by the above method was exposed to air under conditions of an ambient temperature of 25° C. and humidity of 60% for one day. After that, the negative electrode was vacuum-dried at 70° C. for 6 hours to remove moisture attached to the negative electrode and an exposed doped negative electrode was obtained.

Coin cells were prepared with the doped negative electrodes exposed by the above method, and the first time charge/discharge efficiency was calculated according to the above method. Results are shown in Table 7.

Example 7-2

(Li Pre-Doping to Negative Electrode)
(Pre-Doping Step)

The BP of 0.2 mol/L concentration and a saturation amount of metallic Li were dissolved in THF. In the solution, the negative electrode prepared in the same method as in Example 7-1 was soaked at 25° C. for 10 minutes to pre-dope Li into the negative electrode.

(Impurity Removing Step)

The negative electrode pre-doped with the Li was soaked in the THF for 1 minute, followed by pulling up and vacuum drying for 5 minutes.

(Heat Treatment Step)

The negative electrode was heated at 70° C. for 30 minutes in a dry air atmosphere to obtain a doped negative electrode.

Coin cells were prepared with the doped negative electrodes exposed in the same manner as in Example 7-1 and the first time charge/discharge efficiency was calculated according to the described manner. Results are shown in Table 7.

Example 7-3

(Lithium Pre-doping to Negative Electrode)
(Pre-Doping Step)

The BP of 0.2 mol/L concentration and a saturation amount of metal Li were dissolved in THF. In the solution, the negative electrode prepared in the same method as in Example 7-1 was soaked at 25° C. for 10 minutes to pre-dope Li into the negative electrode.

(Impurity Removing Step)

The negative electrode pre-doped with the Li was soaked in the THF for 1 minute, followed by pulling up and vacuum drying for 5 minutes.

(Heat Treatment Step)

The negative electrodes were heated at 100° C. for 32 minutes in a dry air atmosphere to obtain a doped negative electrode.

(Air Exposure and Drying Treatment of Doped Negative Electrode)

The doped negative electrodes prepared according to the above method were exposed to air under the condition of a temperature of 25° C. and humidity 60% for from one day to 7 days. Thereafter, moisture attached to the negative electrodes was removed by vacuum drying the negative electrodes at 70° C. for 6 hours to obtain exposed and doped negative electrodes.

Coin cells were prepared with the doped negative electrodes exposed in the above method and the first time charge/discharge efficiency was calculated according to the method described above. Results are shown in Table 7 and Table 8.

Example 7-4

(Pre-Doping Step)

The BP of 0.2 mol/L concentration and a saturation amount of metallic Li were dissolved in THF. In the solution, the negative electrode prepared in the same method as in Example 7-1 was soaked at 25° C. for 10 minutes to pre-dope Li into the negative electrode.

(Impurity Removing Step)

The negative electrodes pre-doped with the Li were soaked in the THF for 1 minute, followed by pulling up and vacuum drying for 5 minutes.

(Heat Treatment Step)

The negative electrodes were heated in a dry air atmosphere at 100° C. for 30 minutes to obtain doped negative electrodes.

Coin cells were prepared with the doped negative electrodes exposed in the same method as in Example 7-3 and the first time charge/discharge efficiency was calculated according to the method described above. Results are shown in Table 7 and Table 8.

Example 7-5

(Lithium Pre-Doping into Negative Electrode)
(Pre-Doping Step)

The BP of 0.2 mol/L concentration and a saturation amount of metallic Li were dissolved in THF. In the solution, the negative electrodes prepared in the same method as in Example 7-1 were soaked at 25° C. for 10 minutes to pre-dope Li into the negative electrodes.

(Impurity Removing Step)

The negative electrodes pre-doped with the Li were soaked in the THF for 1 minute, followed by pulling up and vacuum drying for 5 minutes.

(Heat Treatment Step)

The negative electrodes were heated at 100° C. for 120 minutes in a dry air atmosphere to obtain doped negative electrodes.

Coin cells were prepared with the doped negative electrodes exposed in the same method as in Example 7-1 and the first time charge/discharge efficiency was calculated according to the method described above. Results are shown in Table 7.

Example 7-6

(Lithium Pre-Doping into Negative Electrode)
(Pre-Doping Step)

The BP of 0.2 mol/L concentration and a saturation amount of metal Li were dissolved in THF. In the solution, the negative electrodes prepared in the same method as in Example 7-1 were soaked at 25° C. for 10 minutes to pre-dope Li into the negative electrodes.

(Impurity Removing Step)

The negative electrodes pre-doped with the Li were soaked in the THF for 1 minute, followed by pulling up and vacuum drying for 5 minutes.

(Heat Treatment Step)

The negative electrodes were heated in an argon atmosphere at 100° C. for 120 minutes to obtain doped negative electrodes.

Coin cells were prepared with the doped negative electrodes exposed in the same method as in Example 7-1 and the first time charge/discharge efficiency was calculated according to the method described above. Results are shown in Table 7.

Example 7-7

(Lithium Pre-Doping into Negative Electrode)
(Pre-Doping Step)

The BP of 0.2 mol/L concentration and a saturation amount of metallic Li were dissolved in THF. In the solution, the negative electrodes prepared in the same method as in Example 7-1 were soaked at 25° C. for 10 minutes to pre-dope Li into the negative electrodes.

(Impurity Removing Step)

The negative electrodes pre-doped with the Li were soaked in the THF for 1 minute, followed by pulling up and vacuum drying for 5 minutes.

(Heat Treatment Step)

The negative electrodes were heated in a dry air atmosphere at 100° C. for 1080 minutes to obtain doped negative electrodes.

Coin cells were prepared with the doped negative electrodes exposed in the same method as in Example 7-1 and the first time charge/discharge efficiency was calculated according to the method described above. Results are shown in Table 7.

Example 7-8

(Lithium Pre-Doping into Negative Electrode)
(Pre-Doping Step)

The BP of 0.2 mol/L concentration and a saturation amount of metallic Li were dissolved in THF. In the solution, the negative electrodes prepared in the same method as in Example 7-1 were soaked at 25° C. for 10 minutes to pre-dope Li into the negative electrodes.

(Impurity Removing Step)

The negative electrodes pre-doped with the Li were soaked in the THF for 1 minute, followed by pulling up and vacuum drying for 5 minutes.

(Heat Treatment Step)

The negative electrodes were heated at 180° C. for 30 minutes in a dry air atmosphere to obtain doped negative electrodes.

Coin cells were prepared with the doped negative electrodes exposed in the same method as in Example 7-1 and the first time charge/discharge efficiency was calculated according to the method described above. Results are shown in Table 7.

Example 7-9

(Lithium Pre-Doping into Negative Electrode)
(Pre-Doping Step)

The BP of 0.2 mol/L concentration and a saturation amount of metallic Li were dissolved in THF. In the solution, the negative electrodes prepared in the same method (however, a binder weight ratio was changed as shown in Table 7) as in Example 7-1 were soaked at 25° C. for 10 minutes to pre-dope Li into the negative electrodes.

(Impurity Removing Step)

The negative electrodes pre-doped with the Li were soaked in the THF for 1 minute, followed by pulling up and vacuum drying for 5 minutes.

(Heat Treatment Step)

The negative electrodes were heated at 210° C. for 30 minutes in a dry air atmosphere to obtain doped negative electrodes.

Coin cells were prepared with the doped negative electrodes exposed in the same method as in Example 7-1 and the first time charge/discharge efficiency was calculated according to the method described above. Results are shown in Table 7.

Comparative Example 7-1

(Lithium Pre-Doping into Negative Electrode)
(Pre-Doping Step)

The BP of 0.2 mol/L concentration and a saturation amount of metallic Li were dissolved in THF. In the solution, the negative electrodes prepared in the same method as in Example 7-1 were soaked at 25° C. for 10 minutes to pre-dope Li into the negative electrodes.

(Impurity Removing Step)

The negative electrodes pre-doped with the Li were soaked in the THF for 1 minute, followed by pulling up and vacuum drying for 5 minutes.

(Heat Treatment Step)

The step was not applied.

Coin cells were prepared with the doped negative electrodes exposed in the same method as in Example 7-1 and the first time charge/discharge efficiency was calculated according to the method described above. Results are shown in Table 7.

TABLE 7

| | | Example 7-1 | Example 7-2 | Example 7-3 | Example 7-4 | Example 7-5 | Example 7-6 | Example 7-7 | Example 7-8 | Example 7-9 | Comparative Example 7-1 |
|---|---|---|---|---|---|---|---|---|---|---|---|
| Active material | (A) Alloy-based Material | SiO | SiO | SiO | SiO | SiO | SiO | SiO | SiO | SiO | SiO |
| | (B) Carbon Particles | MAGD | MAGD | MAGD | MAGD | MAGD | MAGD | MAGD | MAGD | MAGD | MAGD |
| | (A) Volume Ratio (vol %/A + B) | 20 | 20 | 20 | 20 | 20 | 20 | 20 | 20 | 20 | 20 |
| Binder | Polymer Species | PAAH | PAAH | PAAH | PAAH | PAAH | PAAH | PAAH | PAAH | PAAH | PAAH |
| | Polymer Weight ratio (% to the mixture) | 7 | 7 | 7 | 7 | 7 | 7 | 7 | 5 | 10 | 7 |
| Heat Treatment Temperature after Doping (° C.) | | 60 | 70 | 100 | 100 | 100 | 100 | 100 | 180 | 210 | None |
| Heat Treatment Time after Doping (min) | | 30 | 30 | 20 | 30 | 120 | 120 | 1080 | 30 | 30 | — |
| Heat Treatment Atmosphere Gas after Doping | | Air | Air | Air | Air | Air | Ar | Air | Air | Air | — |
| Capacity of Li-containing Negative electrode after leaving for One Day in Air | a) Capacity at the Time of Li Insertion (mAh/g) | 650 | 624 | 634 | 629 | 638 | 628 | 642 | 622 | 635 | 642 |
| | b) Capacity at the time of Li release (1.2 V cut, mAh/g) | 570 | 566 | 571 | 573 | 576 | 564 | 583 | 561 | 577 | 544 |
| First Time Charge/discharge Efficiency (%) | | 88 | 91 | 90 | 91 | 90 | 90 | 91 | 90 | 91 | 85 |

TABLE 8

| | | Example 7-3 | Example 7-4 |
|---|---|---|---|
| Active material | (A) Alloy-based Material | SiO | SiO |
| | (B) Carbon Particles | MAGD | MAGD |
| | (A) Volume Ratio (vol %/A + B) | 20 | 20 |
| Binder | Polymer Species | PAAH | PAAH |
| | Polymer Weight ratio {% to the Mixture) | 7 | 7 |
| Heat Treatment Temperature after Doping (° C.) | | 100 | 100 |
| Heat Treatment Time after Doping (min) | | 20 | 30 |
| Heat Treatment Atmosphere Gas after Doping | | Air | Air |
| Capacity of Li-containing Negative electrode after leaving for One Day in Air | a) Capacity at the Time of Li Insertion (mAh/g) | 658 | 640 |
| | b) Capacity at the time of Li release (1.2 V cut, mAh/g) | 571 | 574 |
| First Time Gharge/discharge Efficiency (%) | | 87 | 90 |

As shown in Table 7, in Examples 7-1 to 7-9 that use the negative electrodes produced according the production method of the negative electrode of the present invention, results of the first time charge/discharge efficiencies were excellent. On the other hand, in Comparative Example 7-1 in which the heating step of the negative electrode was not applied after obtaining the negative electrode containing the particles of lithium-containing silicon compound, result of the first time charge/discharge efficiency was poor. Furthermore, as shown in Table 8, it was found that the negative electrode obtained according to the production method of the negative electrode of the present invention may improve the first time charge/discharge efficiency even after leaving in air for 7 days.

By the way, it is to be noted that the present invention is not limited to the foregoing embodiment. The embodiment is just an exemplification, and any of examples that have substantially the same feature and demonstrate the same functions and effects as those in the technical concept described in claims of the present invention are included in the technical scope of the present invention.

The invention claimed is:

1. A production method of a negative electrode active material for non-aqueous electrolyte secondary batteries containing particles of lithium-containing silicon compound comprising:
    preparing particles of silicon compound containing a silicon compound (SiOx: $0.5 \leq x \leq 1.6$);
    obtaining particles of lithium-containing silicon compound by making the particle of silicon compound contact with a solution A that contains lithium and has an ether-based solvent as a solvent; and heating the particles of the lithium-containing silicon compound, wherein a solution that contains lithium, contains one or more kinds selected from biphenyl, terphenyl and derivatives thereof, and has an ether-based solvent as a solvent is used as the solution A.

2. The production method of a negative electrode active material for non-aqueous electrolyte secondary batteries according to claim 1, wherein forming a carbon coating film on the particles of silicon compound is provided before the obtaining the particles of lithium-containing silicon compound.

3. The production method of a negative electrode active material for non-aqueous electrolyte secondary batteries according to claim 1, wherein in the preparing the particles of silicon compound, the particles of silicon compound having a crystallite size of silicon of 3 nm or more and 10 nm or less are prepared.

4. The production method of a negative electrode active material for non-aqueous electrolyte secondary batteries according to claim 1, wherein in the obtaining the particles of lithium-containing silicon compound, a time of making contact with the solution A is set to 3 minutes or more.

5. The production method of a negative electrode active material for non-aqueous electrolyte secondary batteries according to claim 1, wherein in the heating, a maximum temperature is set to 150° C. or more and 800° C. or less.

6. The production method of a negative electrode active material for non-aqueous electrolyte secondary batteries according to claim 1, wherein a lithium content of the particles of lithium-containing silicon compound is set to 4% by mass or more and 30% by mass or less.

7. The production method of a negative electrode active material for non-aqueous electrolyte secondary batteries according to claim 1, wherein the heating is performed after the obtaining the particles of lithium-containing silicon compound without making the particles of lithium-containing silicon compound contact with moisture.

8. A production method of a negative electrode for non-aqueous electrolyte secondary batteries containing a negative electrode active material containing particles of lithium-containing silicon compound comprising:

forming a negative electrode containing a negative electrode active material containing particles of silicon compound containing a silicon compound (SiOx: $0.5 \leq x \leq 1.6$);

obtaining a negative electrode containing particles of lithium-containing silicon compound by making particles of silicon compound contained in the negative electrode contact with a solution A that contains lithium and has an ether-based solvent as a solvent; and heating the negative electrode containing the particles of lithium-containing silicon compound, wherein a solution that contains lithium, contains one or more kinds selected from biphenyl, terphenyl and derivatives thereof, and has an ether-based solvent as a solvent is used as the solution A.

9. The production method of a negative electrode for non-aqueous electrolyte secondary batteries according to claim 8, wherein before the forming the negative electrode, forming a carbon coating film on a surface of the particle of silicon compound is provided.

10. The production method of a negative electrode for non-aqueous electrolyte secondary batteries according to claim 8, wherein in the forming the negative electrode, silicon having a crystallite size of 3 nm or more and 10 nm or less is used as the particles of silicon compound.

11. The production method of a negative electrode for non-aqueous electrolyte secondary batteries according to claim 8, wherein a time of making contact with the solution A is set to 3 minutes or more in the obtaining the negative electrode containing the particles of lithium-containing silicon compound.

12. The production method of a negative electrode for non-aqueous electrolyte secondary batteries according to claim 8, wherein the heating is performed at a heating temperature of 70° C. or more.

13. The production method of a negative electrode for non-aqueous electrolyte secondary batteries according to claim 8, wherein in the heating, a heating time is 30 minutes or more.

14. The production method of a negative electrode for non-aqueous electrolyte secondary batteries according to claim 8, wherein the heating step is a step performed under an inert gas atmosphere or an ambient atmosphere.

15. The production method of a negative electrode for non-aqueous electrolyte secondary batteries according to claim 8, wherein a lithium content of the particles of lithium-containing silicon compound is made to 4% by mass or more and 30% by mass or less by the obtaining a negative electrode containing the particles of lithium-containing silicon compound.

16. The production method of a negative electrode for non-aqueous electrolyte secondary batteries according to claim 8, wherein the negative electrode that further contains a binder is formed in the forming the negative electrode.

\* \* \* \* \*